United States Patent
Chakraborty et al.

(10) Patent No.: US 8,780,689 B2
(45) Date of Patent: Jul. 15, 2014

(54) METHOD AND SYSTEM FOR REDUCING FEEDBACK INFORMATION IN MULTICARRIER-BASED COMMUNICATION SYSTEMS BASED ON TIERS

(75) Inventors: Kaushik Chakraborty, San Diego, CA (US); Soumya Das, San Diego, CA (US); Ozgur Dural, San Diego, CA (US); Krishnan Rajamani, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/716,104

(22) Filed: Mar. 2, 2010

(65) Prior Publication Data

US 2010/0226269 A1    Sep. 9, 2010

Related U.S. Application Data

(60) Provisional application No. 61/157,144, filed on Mar. 3, 2009.

(51) Int. Cl.
*H04W 4/00* (2009.01)
(52) U.S. Cl.
USPC ............................ 370/208; 370/332; 370/340
(58) Field of Classification Search
USPC .......... 370/208, 319, 349, 329, 335, 344, 347
See application file for complete search history.

(56) References Cited

U.S. PATENT DOCUMENTS

| | | | |
|---|---|---|---|
| 5,940,439 A | 8/1999 | Kleider et al. | |
| 6,108,374 A | 8/2000 | Balachandran et al. | |
| 6,131,016 A | 10/2000 | Greenstein et al. | |
| 6,154,489 A | 11/2000 | Kleider et al. | |
| 7,457,588 B2 | 11/2008 | Love et al. | |
| 7,492,699 B2 * | 2/2009 | Cho | 370/203 |
| 7,903,538 B2 * | 3/2011 | Jacobsen et al. | 370/208 |
| 7,953,170 B2 | 5/2011 | Currivan et al. | |
| 8,041,308 B2 | 10/2011 | Yun et al. | |
| 2002/0191703 A1 | 12/2002 | Ling et al. | |
| 2004/0106412 A1 | 6/2004 | Laroia et al. | |
| 2004/0109424 A1 | 6/2004 | Chheda | |
| 2004/0136399 A1 | 7/2004 | Roberts | |
| 2005/0157670 A1 | 7/2005 | Tang et al. | |

(Continued)

FOREIGN PATENT DOCUMENTS

| | | | |
|---|---|---|---|
| EP | 1806893 A2 | 7/2007 | |
| EP | 1816758 A2 | 8/2007 | |

(Continued)

OTHER PUBLICATIONS

Caire G, et al., "Feedback schemes for multiuser MIMO-OFDM downlink" Information Theory and Applications Workshop, 2008, IEEE, Piscataway, NJ, USA, Jan. 27, 2008, pp. 33-40, XP031307631.

(Continued)

*Primary Examiner* — Brenda H Pham

(57) ABSTRACT

Systems and methods for decreasing the amount of information sent on a feedback channel are disclosed. A hierarchical tree structure may be used to reduce the amount of information sent on the feedback channel. Spectral binning may also be used in conjunction with the hierarchical tree structure.

52 Claims, 12 Drawing Sheets

(56) References Cited

U.S. PATENT DOCUMENTS

| | | |
|---|---|---|
| 2005/0213690 A1 | 9/2005 | Lauer et al. |
| 2005/0287978 A1 | 12/2005 | Maltsev et al. |
| 2006/0072567 A1 | 4/2006 | Casaccia et al. |
| 2006/0274712 A1 | 12/2006 | Malladi et al. |
| 2007/0237167 A1* | 10/2007 | Kaneko et al. ............... 370/437 |
| 2007/0243839 A1 | 10/2007 | Kostic |
| 2007/0264932 A1 | 11/2007 | Suh et al. |
| 2008/0009302 A1 | 1/2008 | Cho et al. |
| 2008/0152028 A1 | 6/2008 | Futaki et al. |
| 2008/0181160 A1 | 7/2008 | Dillon |
| 2009/0060064 A1 | 3/2009 | Futaki et al. |
| 2010/0226452 A1 | 9/2010 | Chakraborty et al. |
| 2010/0227561 A1 | 9/2010 | Chakraborty et al. |

FOREIGN PATENT DOCUMENTS

| | | |
|---|---|---|
| GB | 2386519 A | 9/2003 |
| JP | 2003169036 A | 6/2003 |
| JP | 2005502223 A | 1/2005 |
| JP | 2007043697 A | 2/2007 |
| JP | 2008539667 A | 11/2008 |
| WO | WO-0249305 A2 | 6/2002 |
| WO | WO02078211 | 10/2002 |
| WO | 2006049123 A1 | 5/2006 |
| WO | 2006107037 A1 | 10/2006 |
| WO | 2006116102 A2 | 11/2006 |
| WO | WO2007136212 A2 | 11/2007 |
| WO | WO2008054099 A1 | 5/2008 |

OTHER PUBLICATIONS

Ekpenyong A E, et al., "Feedback Constraints for Adaptive Transmission" IEEE Signal Processing Magazine, IEEE Service Center, Piscataway, NJ, US, vol. 24, No. 3, May 1, 2007, pp. 69-78, XP011184724.

International Search Report—PCT/US2010/026090—International Search Authority, European Patent Office, Feb. 17, 2011.

International Search Report and Written Opinion—PCT/US2010/026114, International Search Authority—European Patent Office—Feb. 17, 2011.

Myeon-Gyun Cho et al: "A Joint Feedback 25,32, Reduction Scheme Using Delta Modulation 39,46 for Dynamic Channel Allocation in OFDMA Systems" IEEE International Symposium on Personal, Indoor and Mobile Radio Communications, vol. 4, Sep. 11, 2005, pp. 2747-2750, XP010928190.

Chen, et al: "The Capacity of Finite-State Markov Channels with Feedback", IEEE Transactions on Information Theory, IEEE, US, vol. 51, No. 3, Mar. 1, 2005, pp. 780-798, XP011127412, ISSN: 0018-9448, DOI:10.1109/TIT.2004.842697.

Harish Viswanathan: "Capacity of Markov Channels with Receiver CSI and Delayed Feedback", IEEE Transactions on Information Theory, IEEE, US, vol. 45, No. 2, Mar. 1, 1999, XP011027310, ISSN: 0018-9448, pp. 761-771.

Taiwan Search Report—TW099106202—TIPO—Apr. 23, 2013.

\* cited by examiner

| Rate (Mbps) | Bits | Rate (Mbps) | Bits |
|---|---|---|---|
| 53.3 | 000 | 200 | 100 |
| 80 | 001 | 320 | 101 |
| 106.7 | 010 | 400 | 110 |
| 160 | 011 | 480 | 111 |

| Tone # | Current State of Tone | Tier 1 | Tier 2 | Tier 3 |
|---|---|---|---|---|
| Tone 1 | 101 | 1 | 0 | 1 |
| Tone 2 | 101 | 1 | 0 | 1 |
| Tone 3 | 100 | 1 | 0 | 0 |
| Tone 4 | 101 | 1 | 0 | 1 |
| Tone 5 | 110 | 1 | 1 | 0 |
| Tone 6 | 100 | 1 | 0 | 0 |
| Tone 7 | 011 | 0 | 1 | 1 |
| Tone 8 | 010 | 0 | 1 | 0 |
| Tone 9 | 010 | 0 | 1 | 0 |
| Tone 10 | 011 | 0 | 1 | 1 |

700

| Tone # | Current State of Tone | Tier 1 | Tier 2 | Tier 3 |
|--------|----------------------|--------|--------|--------|
| Tone 1 | 101 | 1 | 0 | X |
| Tone 2 | 101 | 1 | 0 | X |
| Tone 3 | 100 | 1 | 0 | X |
| Tone 4 | 101 | 1 | 0 | X |
| Tone 5 | 110 | 1 | 1 | X |
| Tone 6 | 100 | 1 | 0 | X |
| Tone 7 | 011 | 0 | 1 | X |
| Tone 8 | 010 | 0 | 1 | X |
| Tone 9 | 010 | 0 | 1 | X |
| Tone 10 | 011 | 0 | 1 | X |

FIG. 7

| Compression Scheme | | Feedback load (bits) | Average rate (Mbps) |
|---|---|---|---|
| No compression | | 384 | 226.14 |
| Hierarchical Tree Method | Tier 1, 2, 3 | 490.14 | 226.14 |
| | Tier 1,2 | 270.49 | 211.4 |

FIG. 12

METHOD AND SYSTEM FOR REDUCING FEEDBACK INFORMATION IN MULTICARRIER-BASED COMMUNICATION SYSTEMS BASED ON TIERS

RELATED APPLICATIONS

The present application for patent claims priority to U.S. Provisional Application No. 61/157,144 entitled "METHOD AND SYSTEM FOR REDUCING FEEDBACK INFORMATION IN COMMUNICATION SYSTEMS", filed Mar. 3, 2009, which is hereby expressly incorporated by reference in its entirety. This application has related subject matter to, and incorporates by reference in its entirety, Ser. No. 12/716,032, entitled "METHOD AND SYSTEM FOR REDUCING FEEDBACK INFORMATION IN MULTICARRIER-BASED COMMUNICATION SYSTEMS BASED ON FREQUENCY GROUPING", filed simultaneously with this application. This application also has related subject matter to, and incorporates by reference in its entirety, Ser. No. 12/716,064, entitled "METHOD AND SYSTEM FOR REDUCING FEEDBACK INFORMATION IN MULTI-CARRIER-BASED COMMUNICATION SYSTEMS BASED ON TEMPORAL CORRELATION", filed simultaneously with this application.

BACKGROUND

1. Field

The application generally relates to communication networks and communication systems, including wideband and ultra-wideband communication systems. In particular, the application relates to systems and methods for reducing the amount of data traffic on a feedback channel between a receiver and a transmitter.

2. Background

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiplexing (OFDM) systems. Many forms of wireless communication systems use a feedback channel to improve the performance of the system. As data is sent between a transmitter and a receiver, the conditions of the communication channel being used may change. For example, as the receiver moves farther away from the transmitter, the communication channel conditions may degrade. The communication channel may also comprise a plurality of sub-carriers. Generally, the feedback channel is used by the receiver to transmit information about these changes in channel conditions to the transmitter. The information transmitted by the receiver on the feedback channel is often referred to as channel state information (CSI). In one embodiment, CSI may comprise an estimate or information about channel conditions for a certain channel. In another embodiment, CSI may comprise at least one of carrier-to-noise ratio (CNR), signal-to-noise ratio (SNR), received signal strength indicator (RSSI), signal-to-interference-and-noise-ratio (SINR), a signal strength, a noise level, and a data rate. It may also be referred to as channel quality indicator (CQI).

Generally, the CSI is sent from the receiver to the transmitter and may consume significant amounts of signaling resources. The CSI may provide, to the transmitter, data indicative of channel conditions obtained by the receiver. In one embodiment, the transmitter uses the CSI to control certain transmitter parameters including but not limited to, transmit signal power, data rate, or modulation and coding scheme. The CSI may be sent using CSI packets (e.g., packets sent from the receiver to the transmitter, which contain CSI). A plurality of CSI packets may be sent to the transmitter for a single feedback updates (e.g., an update that provides CSI for channel). In multicarrier-based wideband (WB) and ultra-wideband systems (UWB), e.g., OFDM-based systems, the feedback channel may be used to provide information for the plurality of subcarriers (e.g., tones). The feedback channel is responsible for providing CSI for the individual subcarriers on a timely basis, so that the transmitter may act on the available information. For example, if a transmitter receives CSI indicating that channel conditions have degraded, the transmitter may decide to transmit at a slower data rate. Thus, it is desirable to preserve signaling resources by reducing the amount of data traffic transmitted over feedback channels.

SUMMARY

In one embodiment, a wireless communication apparatus operable in a communication system is provided. The wireless communication apparatus comprises a channel estimator module configured to indicate a state of a first channel condition for a first carrier frequency group using a first plurality of bits. The channel estimator module is further configured to indicate a state of a second channel condition for a second carrier frequency group using a second plurality of bits. Each of the first and second plurality of bits being equally arranged in a plurality of same bit positions between a most significant bit position and a least significant bit position. The apparatus also comprises a processor module configured to identify a bit position in at least one of the plurality of bit positions in which a bit value has changed to identify a changed bit position. The apparatus further comprises a communication module configured to communicate from a receiver to a transmitter data indicative of bit values of all bits located in the changed bit position within each of the first and second plurality of bits.

In another embodiment, a wireless communication apparatus operable in a communication system is provided. The wireless communication apparatus comprises means for indicating a state of a first channel condition for a first carrier frequency group using a first plurality of bits, and indicating a state of a second channel condition for a second carrier frequency group using a second plurality of bits. Each of the first and second plurality of bits being equally arranged in a plurality of same bit positions between a most significant bit position and a least significant bit position. The apparatus also comprises means for identifying a bit position in at least one of the plurality of bit positions in which a bit value has changed to identify a changed bit position. The apparatus further comprises means for communicating from a receiver to a transmitter data indicative of bit values of all bits located in the changed bit position within each of the first and second plurality of bits.

In yet another embodiment, a method of communicating in a communication system is provided. The method comprises indicating a state of a first channel condition for a first carrier frequency group using a first plurality of bits. The method also comprises indicating a state of a second channel condition for a second carrier frequency group using a second plurality of bits. Each of the first and second plurality of bits being equally arranged in a plurality of same bit positions between a most significant bit position and a least significant bit position. The method further comprises identifying a bit position in at least one of the plurality of bit positions in which a bit value has changed to identify a changed bit position. The method also comprises communicating from a receiver to a transmitter data indicative of bit values of all bits located in the changed bit position within each of the first and second plurality of bits.

In a further embodiment, a computer program product, comprising a computer-readable medium is provided. The medium comprises code for causing a computer to indicate a state of a first channel condition for a first carrier frequency group using a first plurality of bits, and to indicate a state of a second channel condition for a second carrier frequency group using a second plurality of bits. Each of the first and second plurality of bits being equally arranged in a plurality of same bit positions between a most significant bit position and a least significant bit position. The medium also comprises code for causing a computer to identify a bit position in at least one of the plurality of bit positions in which a bit value has changed to identify a changed bit position. The medium further comprises code for causing a computer to communicate from a receiver to a transmitter data indicative of bit values of all bits located in the changed bit position within each of the first and second plurality of bits.

In one embodiment, a wireless communication apparatus operable in a communication system is provided. The wireless communication apparatus comprises a channel estimator module configured to indicate a state of a first channel condition for a first carrier frequency group using a first plurality of bits. The channel estimator module is further configured to indicate a state of a second channel condition for a second carrier frequency group using a second plurality of bits. Each of the first and second plurality of bits being arranged in N bit positions between a most significant bit position and a least significant bit position, wherein "N" is an integer greater than one (1). The apparatus also comprises a communication module configured to communicate from a receiver to a transmitter data indicative of bit values located in K bit positions within the first and second plurality of bits, wherein "K" is an integer less than "N."

In another embodiment, a wireless communication apparatus operable in a communication system is provided. The wireless communication apparatus comprises means for indicating a state of a first channel condition for a first carrier frequency group by using a first plurality of bits, and indicating a state of a second channel condition for a second carrier frequency group by using a second plurality of bits. Each of the first and second plurality of bits being arranged in N bit positions between a most significant bit position and a least significant bit position, wherein "N" is an integer greater than one (1). The apparatus further comprises means for communicating from a receiver to a transmitter data indicative of bit values located in K bit positions within the first and second plurality of bits, wherein "K" is an integer less than "N."

In yet another embodiment, a method of communicating in a communication system is provided. The method comprises indicating a state of a first channel condition for a first carrier frequency group by using a first plurality of bits, and indicating a state of a second channel condition for a second carrier frequency group by using a second plurality of bits. Each of the first and second plurality of bits being arranged in N bit positions between a most significant bit position and a least significant bit position, wherein "N" is an integer greater than one (1). The method further comprises communicating from a receiver to a transmitter data indicative of bit values located in K bit positions within the first and second plurality of bits, wherein "K" is an integer less than "N."

In a further embodiment, a computer program product, comprising computer-readable medium is provided. The medium comprises code for causing a computer to indicate a state of a first channel condition for a first carrier frequency group using a first plurality of bits, and to indicate a state of a second channel condition for a second carrier frequency group using a second plurality of bits. Each of the first and second plurality of bits being arranged in N bit positions between a most significant bit position and a least significant bit position, wherein "N" is an integer greater than one (1). The medium further comprises code for causing a computer to communicate from a receiver to a transmitter data indicative of bit values located in K bit positions within the first and second plurality of bits, wherein "K" is an integer less than "N."

BRIEF DESCRIPTION OF THE DRAWINGS

FIG. 7 is a table illustrating other exemplary tier levels for Tones 1 through 10 of the communication system shown in FIG. 3.

FIG. 12 is a table showing exemplary feedback loads for and average data rates.

DETAILED DESCRIPTION

Figure 1:
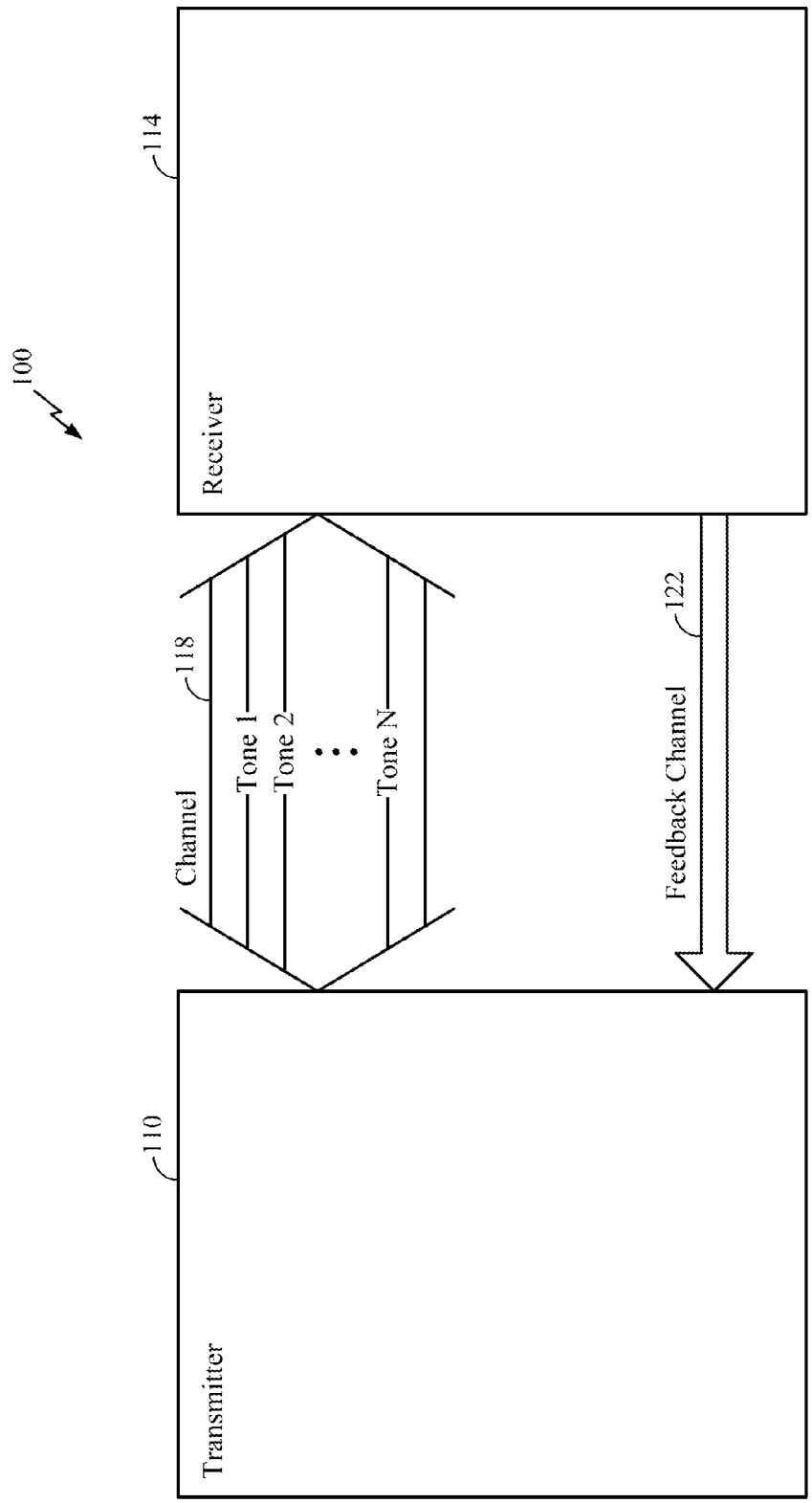
FIG. 1 is a block diagram illustrating a transmitter and a receiver in an exemplary wideband or ultrawideband wireless communication system.

In communication systems, channel conditions may be estimated via pilot tones at the receiver using techniques like least square (LS) estimation in both time domain and frequency domain. A pilot tone generally refers to a signal (e.g., a single frequency), which may be transmitted over a communications system for supervisory, control, equalization, continuity, synchronization, or reference purposes. Adaptive transmission schemes like power and rate control and other coding/modulation techniques may improve the communication performance of communication systems, provided that the transmitter has accurate estimates of the current channel conditions. As noted above, this channel state information (CSI) is typically conveyed from the receiver to the transmitter via a feedback channel which supports this control information with low latency, a reasonably high degree of accuracy, and low overhead.

For information about generating CQI measurement reports, reference is made to U.S. Pat. No. 7,457,588 (hereinafter '588) which is hereby incorporated by reference in its entirety.

Examples are provided to describe the operation of a feedback channel and the magnitude of information transmitted over the feedback channel. Although the following disclosure is describing applicability of the embodiments to UWB systems, one of ordinary skill in the art understands that certain embodiments are applicable to any communication system using a feedback channel. Some existing UWB system designs are based on the multi-band orthogonal frequency division multiplexing (MB-OFDM) system specified in the ECMA-368 standard. Certain embodiments of the invention may be described with reference to OFDM wireless communication systems. However, one of skill in the art will understand that the embodiments described herein may be applicable to any slowly time-varying wideband communication channel. Some embodiments may also be applicable to faster time-varying wideband communication channels.

As described below, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor, such as an application specific integrated circuit (ASIC). Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

FIG. 1 is a block diagram illustrating a transmitter 110 and a receiver 114 in an exemplary wideband or ultrawideband wireless communication system 100. The communication system 100 may be used to transmit and/or receive data between the transmitter 110 and the receiver 114 via a channel 118. The data may comprise voice, video, and multimedia data. The communication system 100 may comprise any type of communication system including, but not limited to, a code division multiple access (CDMA) system, a global system for mobile communication system (GSM), a wideband code division multiple access (WCDMA), and an OFDM system. The system 100 shown in FIG. 1 comprises an OFDM system. As shown in FIG. 1, the transmitter 110 is configured to transmit data to the receiver 114 via the channel 118. The receiver 114 is also configured to transmit data to the transmitter 110 via the channel 118. The channel 118 comprises multiple tones: Tone 1, Tone 2, up to Tone N. In one embodiment, system 100 effectively partitions the overall system bandwidth into any number of orthogonal tones, such as Tones 1 to N (e.g., as in an OFDM system). In one embodiment, each of Tones 1 to N may be associated with a respective subcarrier upon which data may be transmitted. In another embodiment, each of Tones 1 through N may be independent subcarriers. In yet another embodiment, each of the Tones 1 through 1 may not be independent subcarriers. Each of Tones 1 to N may be viewed as an independent transmission channel that may be used to transmit data between the transmitter 110 and the receiver 114. In one embodiment, the channel 118 may comprise N number of tones. The N number of tones may be any number. For example, N may be 100, such that the channel 118 comprises 100 tones. In another example, N may be 22 such that the channel 118 comprises 22 tones.

In the communication system 100, a substantially accurate estimate of the conditions of the wireless channel between the transmitter 110 and the receiver 114 is desirable in order to effectively transmit data on the available tones. For example, the channel conditions on Tone 1 may improve, while the channel conditions on Tone 2 may deteriorate. Thus, it may be desirable for the transmitter 110 to decrease the signal power for Tone 1, and increase the signal power for Tone 2. The receiver 114 may transmit CSI pertaining to the channel conditions of at least one of the tones, to the transmitter 110, using the feedback channel 122. For example, the receiver 114 may use the feedback channel 122 to transmit CSI to the transmitter 110 indicating an improvement in channel conditions for Tone 1 and a deterioration in channel conditions for Tone 2. The transmitter 110 may use the CSI received from the receiver 114, on the feedback channel 122, to reallocate or change the resources (e.g., transmit power, data rate, etc.) for the Tones 1 to N in the channel 118.

Figure 2:
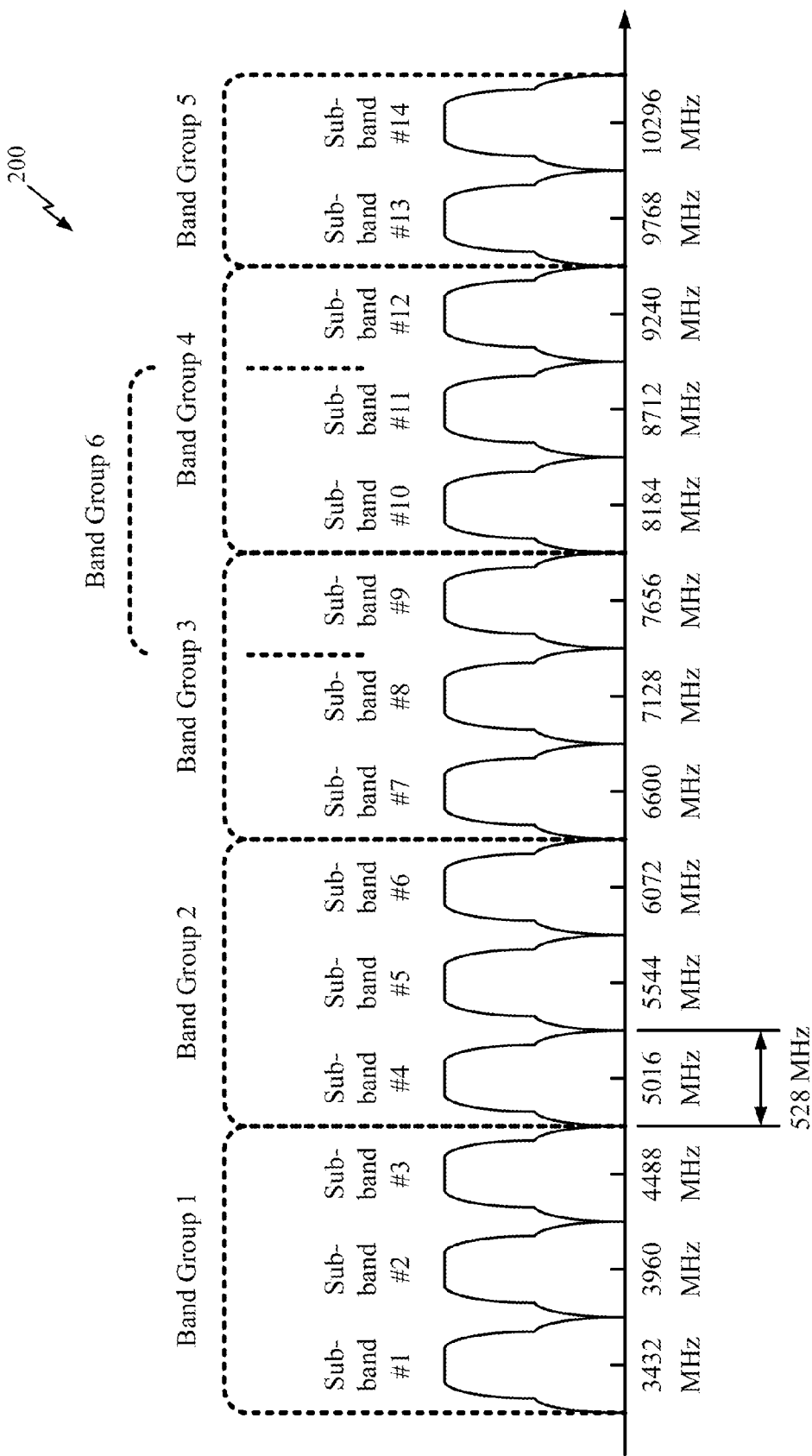
FIG. 2 is a diagram illustrating an exemplary spectrum allocation of the wireless communication system of FIG. 1.

FIG. 2 is a diagram illustrating an exemplary spectrum allocation 200 of the communication system 100 of FIG. 1. In one embodiment, the exemplary spectrum allocation 200 may be a spectrum allocation for a multi-band OFDM system (e.g., a system specified by the ECMA-386 standard). Spectrum allocation 200 is merely an exemplary allocation, and other spectrum allocations (e.g., frequencies and/or divisions of frequencies) may be used by other embodiments. The spectrum allocation 200 shows the different possible frequencies for the Tones 1 to N in the channel 118 of the communication system 100. The spectral range of spectrum allocation 200 ranges within 3.1 through 10.6 GHz. This spectral range of spectrum allocation 200 is subdivided into 14 contiguous sub-bands, Sub-bands 1 through 14. Each of the 14 sub-bands has a bandwidth 528 MHz. Each of the sub-bands contains 128 tones (e.g., at least some of Tones 1 through Tone N of FIG. 1), with a spacing of 4.125 MHz between each of the tones. The 14 sub-bands are grouped into 6 band groups, Band Groups 1 through 6. Band Groups 1 through 4 and 6 each have 3 sub-bands e.g., Band Group 1 has Sub-band 1, Sub-band 2, and Sub-band 3. Band Group 5 has 2 sub-bands: Sub-band 13 and Sub-band 14.

Referring to FIG. 1, the channel 118 may comprise any number of tones from any of the 14 sub-bands. For example, Tones 1 and 2 may be from Sub-band #1, but Tone N may be from Sub-band #3. In another example, Tone 1, Tone 2 up to Tone N may all be from Sub-band #8.

The coherence bandwidth (e.g., the range of tones which may experience similar channel conditions) of the communication system 100 may span several adjacent tones within or across the sub-bands shown in FIG. 2 (e.g., within Sub-Band #1 or across Sub-band #1 and Sub-band #2). Referring to FIG.

2, the coherence bandwidth of the communication system 100, according to one embodiment, is computed for different channel models CM1 through CM4. The channel models CM1 through CM4 are exemplary scenarios which the channel 118 may experience. For further details on the channel models CM1 through CM4, reference is made to J. R. Forester et al., *A Channel Model for Ultra Wideband Indoor Communication*, INTERNATIONAL SYMPOSIUM ON WIRELESS PERSONAL MULTIMEDIA COMMUNICATION (October 2003), which is hereby incorporated by reference in its entirety. For example, CM1 is a scenario where the distance between the transmitter 110 and the receiver 114 is less than 4 meters. In another example, CM3 is a scenario in which the distance between the transmitter 110 and the receiver 114 is four to ten meters. The coherence bandwidth may be 53.6, 28.9, 20.6 and 12.4 MHz in channel models CM1, CM2, CM3 and CM4, respectively. This may be calculated using a normalized cross-correlation of channel coefficients (e.g., real and/or complex numbers that indicate how the channel conditions affect the received signal at the receiver 114) across adjacent tones as a statistical parameter to determine coherence bandwidth. For example, a channel coefficient may represent the amplitude of a fade (e.g., degradation in signal strength) of a channel. The received signal amplitude may be obtained by multiplying a transmitted signal amplitude by the channel coefficient. The channel 118 may be represented in terms of multiple channel coefficients, where each channel coefficient is associated with one of the Tones 1 through N. Since each tone occupies a nominal bandwidth of 4.125 MHz, up to 13, 7, 5 and 3 adjacent tones are correlated in channel models CM1, CM2, CM3 and CM4, respectively. For further details on channel models CM1 through CM4, reference is also made to Q. Zou et al., *Performance Analysis of Multiband OFDM UWB Communications with Application to Range Improvement*, 56 IEEE TRANSACTIONS ON VEHICULAR TECHNOLOGY, 3864, 3864-3878, November 2007), which is hereby incorporated by reference in its entirety.

This indicates that the channel 118 may be correlated in both temporal and spectral dimensions. There may also be other sources of correlation, including but not limited to:
(i) correlation between forward and reverse links in a Time Division Duplexing (TDD) communication mode under quasi-static channel conditions.
(ii) spatial correlation if multiple antennas are deployed
(iii) multiuser correlation if multiple users cooperatively share local channel state information to construct a distributed global channel state matrix As shown in FIG. 2, tones in the communication system 100 may be categorized into Sub-bands 1 through 14. The Sub-bands 1 through 14 may each contain tones which are adjacent to each other. In one embodiment, all of the Tones 1 through N in the communication system 100 may belong to only one of the 14 Sub-bands. In another embodiment, the Tones 1 through N may be spread over multiple Sub-bands. For example, the Tones 1 through N may be spread over 3 Sub-bands. In another embodiment, the Tones 1 through N may be spread over any arbitrary set of Sub-bands. Several adjacent tones in the communication system 100 may experience nearly identical channel conditions. Since the dynamic transmission schemes adapt to the variations of the CSI that are provided to the transmitter 110, it may be desirable for the adaptive scheme to assign the same resources (e.g., signal power and/or data rates) to adjacent tones. This correlation across tones may be gainfully exploited to compress the CSI feedback. As discussed above, spectrum allocation 200 is merely an exemplary allocation and the embodiments described herein may be applicable to any spectrum allocation.

Figure 3:
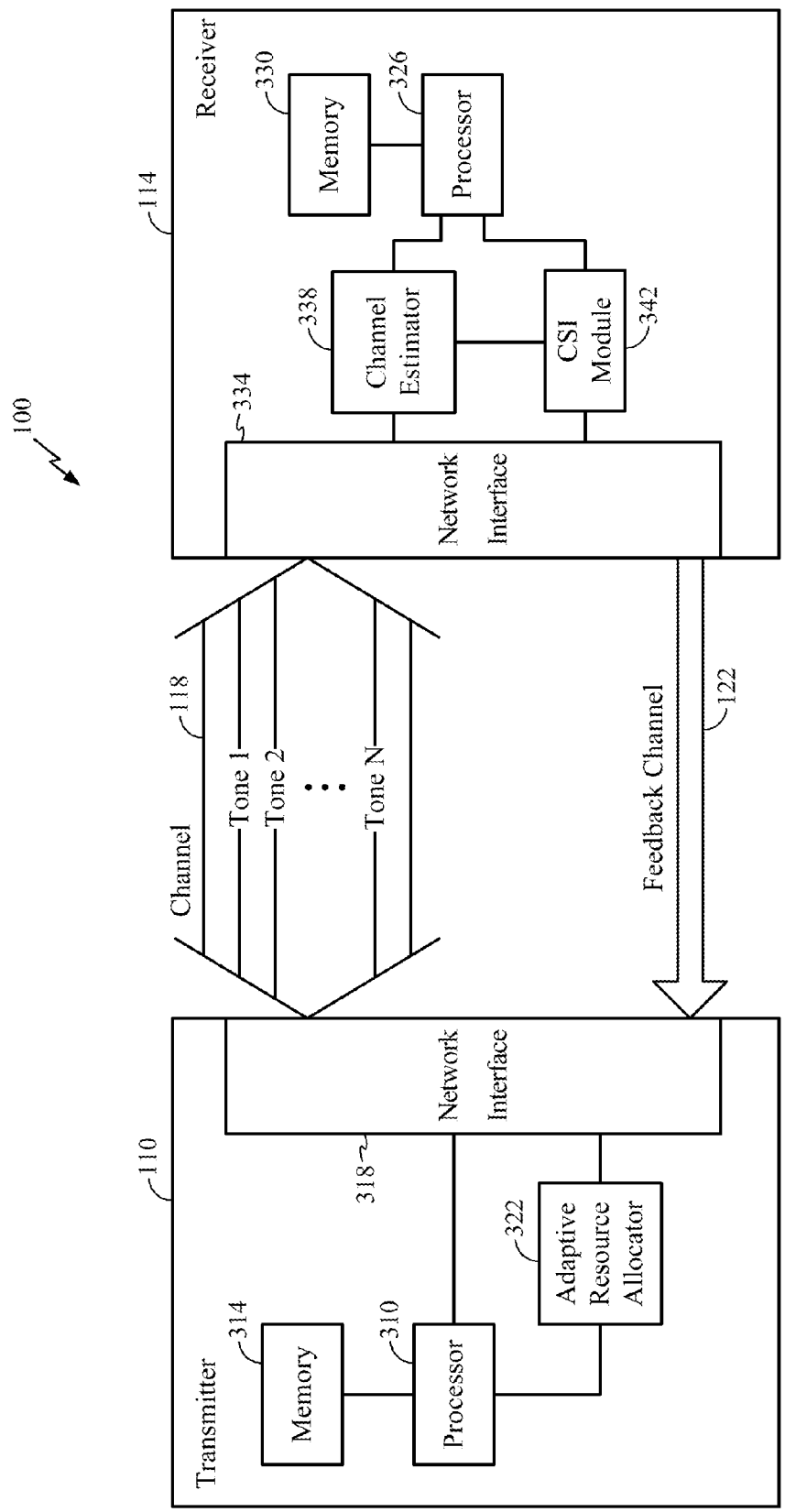
FIG. 3 is a block diagram illustrating exemplary components in the wireless communication system of FIG. 1.

FIG. 3 is a block diagram illustrating exemplary components of the transmitter 110 and the receiver 114 in the communication system 100 of FIG. 1. The transmitter 110 comprises a processor 310, a memory 314, a network interface 318 and an adaptive resource allocator 322. The memory 314 is coupled to the processor 310. The processor 310 is also coupled to the network interface 318 and the adaptive resource allocator 322. The adaptive resource allocator 322 is also coupled to the network interface 318.

The adaptive resource allocator 322 of the transmitter 110 is configured to adaptively allocate resources (e.g., increase/decrease signal power or data rates in response to CSI) for the channel 118. In one embodiment, the transmitter 110 may allocate resources each time new CSI is received. In another embodiment, the transmitter 110 may allocate resources only after a certain amount of CSI is received (e.g., after 3 CSI packets are received from the receiver 114 or after a predetermined period of time is passed). The adaptive resource allocator 322 may process the CSI itself, or it may use the processor 310 to process the CSI. The adaptive resource allocator 322 may then determine how to allocate resources to the tones in the channel 118, based on, at least in part, the CSI received on the feedback channel 122 from the receiver 114. For example, the resource allocator 322 may adjust the signal power for each of Tones 1 to Tone N as shown in FIG. 1. If channel conditions change for any of the tones, the resource allocator 322 may adjust the signal power for the tones based on, at least in part, the channel conditions for the tones. For example, the adaptive resource allocator 322 may increase signal power for Tone 1 and decrease the signal power for Tone 2, based on, at least in part, the CSI received from the feedback channel 122.

The receiver 114 comprises a processor 326, a memory 330, a network interface 334, a channel estimator 338 and a CSI module 342. The memory 330 is coupled to a processor 326. The processor is also coupled to the channel estimator 338, the CSI module 342, and the network interface 334. The channel estimator 338 is coupled to the CSI module 342 and both the channel estimator 338 and the CSI module 342 are coupled to the network interface 334.

The channel estimator 338 of the receiver 114 is configured to determine and/or estimate channel characteristics (e.g., noise level, signal strength, SNR, RSSI, etc.) of at least one of the tones in the channel 118. The channel estimator 338 may use the processor 336 when determining and/or estimating the channel characteristics. The receiver 114 further comprises a channel state information (CSI) module 342 configured to calculate or determine CSI about the channel. This CSI is sent by the receiver 114 over the feedback channel 122 to the transmitter 110. The CSI generated by the CSI module 342 is based on, at least in part, the channel characteristics generated by the channel estimator 338. The CSI module 342 may use the processor 336 to generate the CSI or it may generate the CSI itself.

As shown in FIG. 3, the channel 118 may comprise multiple subcarriers or tones, such as Tones 1 to N. Data transmitted over the channel 118 may be transmitted using any combination of the tones. The channel conditions of the tones may vary over time. The time-varying channel conditions are estimated at the receiver 114 for signal detection via the channel estimator 338. The feedback channel 122 from the receiver 114 to the transmitter 110 periodically provides current estimates of CSI to enable adaptive resource allocation strategies at the transmitter 118. For simplicity while describing certain embodiments, it is desirable for the feedback channel 122 to be substantially noise-free. This means that the CSI is noiselessly communicated from the receiver 114 to the transmitter 110. But in other embodiments, the feedback channel 122 may experience noise. One of skill in the art understands that noise compensation techniques may be used in conjunction with the feedback channel 122.

The processors 310 and 326 may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array. The memories 314 and 330 may comprise a hard disk, RAM, ROM, a memory card, flash memory, a CD-ROM, a DVD-ROM, or any other means for storing data.

The network interfaces 318 and 334 may comprise at least one of a wired network card, a wireless network card, an antenna and some other means for communicating with a network. The network interfaces 318 and 334 may be connected to a local area network (LAN), or a wide area network (e.g., internet) or some other form of network. The network interfaces 318 and 334 may receive signals according to wired technologies including but not limited to Ethernet, telephone (e.g., POTS), and fiber optic systems, and/or wireless technologies including but not limited a code division multiple access (CDMA or CDMA2000) communication system, a time division multiple access (TDMA) system such as GSM/GPRS (General Packet Radio Service)/EDGE (enhanced data GSM environment), IEEE 802.11 systems, and OFDM systems. The network interfaces 318 and 334 may be used to transmit and/or receive a variety of types of data including, but not limited to, voice, video, and multimedia data.

Generally, there are different kinds of adaptive resource allocation to be considered. In one example, feedback may be provided to enable dynamic transmitter rate adaptation. In one embodiment, the receiver 114, based on the available CSI, may explicitly make decisions about resource allocation on behalf of the transmitter 110. In another embodiment, the transmitter 110 may allocate its resources based on, at least in part, the available feedback from the receiver 114. CSI may comprise raw quantization (e.g., converting the channel estimates of the receiver 114 to discrete values without performing any significant additional processing) of the receiver CSI, which is applicable to embodiments in which the receiver 114 aids the decision-making process at the transmitter 110 by providing the transmitter 110 with more information about the current channel conditions. In such an embodiment, the transmitter 110 may communicate its resource allocation decisions to the receiver 114 to ensure that the receiver 114 recovers reliably any information transmitted to it from transmitter 110. In the embodiments where the receiver 114 makes decisions about resource allocation on behalf of the transmitter 110, the receiver 114 is automatically informed of the adaptations, during the receiver decision-making process.

In one embodiment, to further benefit from adaptive transmission schemes, it may be desirable for the transmitter 110 to have accurate and current (e.g., not outdated) CSI on a per-bin basis. In general, the CSI may be a function of the channel conditions estimated at the receiver 114 by the channel estimator 338. Typically, the CSI at the receiver 114 comprises at least a real (or complex) number for each tone. The CSI provides an indicator of the current channel conditions on a per tone basis. If this information in its entirety is fed back to the transmitter 110, this may impose a high amount of traffic on the feedback channel 122. The transmitter 110 may not need the entire receiver CSI in order to perform the necessary adaptive control. Instead, the receiver 114 may quantize the CSI by identifying a partition of the space of receiver CSI into a set of contiguous and disjoint subsets. This partitioning may be done such that for all CSI elements in each of the subsets, the adaptive transmission scheme assigns the same resources. For example, such resources may include: (i) the number of bits in a bit loading algorithm, or (ii) the transmission power in an adaptive power control scheme, etc. The index of the relevant subset may then be fed back to the transmitter 110.

Even with this quantized feedback mechanism, the amount of CSI may be quite large. A quantized feedback mechanism may still result in a large amount of CSI if the adaptive transmission scheme dynamically adjusts its resources on a per-tone basis. In one embodiment, there may be a Link Feedback Information Element (IE) which comprises a single byte of CSI transmitted from the receiver 114 to the transmitter 110 over the feedback channel 122. In one embodiment, the CSI may not be on a per tone basis, but may instead be on a per bin basis, as discussed below in conjunction with FIGS. 5A through 5D. The Link Feedback IE may also comprises 2 bytes to indicate a device address for the device that the CSI is associated with, 1 byte for an element ID, and 1 byte to specify the length of the Link Feedback IE. The element ID may indicate the type of the IE. For example, the Link Feedback IE may have a numerical value of 16 for its element ID. In another embodiment, a single Link Feedback IE may be used to provide CS to multiple transmitters. One embodiment may use 4 bits to update data rate and 4 bits to update transmitter power level changes.

As discussed above, the transmitter 110 does not only periodically adapt the transmission data rate, but may also perform more sophisticated dynamic power allocation and other coding/modulation techniques on individual tones. More refined adaptive schemes may demand a finer granularity of CSI feedback, and may impose a higher load on the feedback channel 122. As described further below, dynamic adaptation may be done at the transmitter 110 based on quantized CSI feedback from the receiver 114 on the feedback channel 122.

In one embodiment, the receiver 114 may estimate various channel parameters, such as the signal-to-noise ratio (SNR) for each tone, and may use this SNR estimate as an indicator of the channel strength. An adaptive transmitter power control algorithm may dynamically adjust the transmitter power level according to the receiver SNR estimate to maximize the average transmission rate over all the data tones. The transmitter 110 may also perform other dynamic coding and modulation schemes based on the quantized SNR information. In this embodiment, partitioning the SNR space into K subsets will require a feedback load (e.g., the amount of information needed to convey CSI to the transmitter 110) of $N_b = \lceil \log_2 K \rceil$ bits per tone per feedback update. For example, with $N_b=6$, a granularity of $2^6=64$ different quantization levels of SNR may be accommodated. Assuming $N_t=100$ tones, the feedback load in this case is 100*6=600 bits per update, which may be larger than desired.

In one embodiment, systems and methods are provided for compressing feedback load (e.g., reducing the amount of CSI) without significantly altering the performance of the adaptive transmission schemes. As discussed above, channel characteristics of communications systems, including the communication system 100 may be highly correlated in several ways. A measure of the duration of time during which channel conditions are substantially unchanged may be referred to as a "coherence time interval", which may be of the order of several milliseconds. On the other hand, the duration of a data packet may typically be of the order of only a few microseconds. For example, with a transmitter-receiver relative mobility speed of v=3 m/s and a carrier frequency $f_c$=4 GHz, a practical estimate of the coherence time is given by $$T_c \approx \frac{0.423c}{vf_c} = \frac{0.423 \times 3 \times 10^8}{3 \times 4 \times 10^9} \approx 10 \text{ ms}.$$

One embodiment specifies variable-sized medium access control (MAC) packets whose transmission duration may range from 0.3125-112.5 μs. Therefore, several consecutive transmitted packets may experience nearly identical channel conditions between the transmitter 110 and the receiver 114.

Figure 4:
FIG. 4 is a table illustrating an exemplary assignment of feedback bits representing different bit rates for the wireless communication system of FIG. 3.

FIG. 4 is a table 400 illustrating an exemplary assignment of feedback bits representing different bit rates for the wireless communication system 100 of FIG. 3. As shown in the table 400, different data rates may be represented by different bit patterns. The table 400 shows the bit patterns used to represent the 8 different data rates. The "Rate (Mbps)" column indicates the speed of the data rate for the Tones 1 through N as shown in FIG. 3. The "Bits" column indicates the bit pattern used to represent the corresponding data rate. For example, Tone 1 in channel 118 may be operating at a data rate of "80 Mbps." The data rate of "80 Mbps" is represented by the bit pattern "001."

For the following description, let $N_t$ denote the number of tones, Tone 1 to N, being used by the channel 118 to communicate data between the transmitter 110 and the receiver 114 of the communication system 100, as shown in FIGS. 1 and 3. Let $N_b$ denote the number of bits of CSI required per update per tone. Then, the total number of feedback bits that needs to be sent via the feedback channel 122 is $N_t*N_b$ per update. Note that $N_b$ may depend on the dynamic resource allocation schemes adapted at the transmitter 110. For example, referring to FIG. 2 and FIG. 3, the table 200 shows that the 8 different data rates used by Tones 1 through N of the communication system 100, are each represented using 3 bits. In another embodiment the communication system 100 may use 16 different data rates, which would require 4 bits to represent all of the 16 data rates. Thus, in this embodiment, $N_b$=4.

Referring to FIG. 3, the communication system 100 has a rate adaptation scheme in which the transmitter 110 assigns to each of Tone 1 to N, one of the following 8 data rates: 53.3 Mbps, 80 Mbps, 106.7 Mbps, 160 Mbps, 200 Mbps, 320 Mbps, 400 Mbps and 480 Mbps. In this example, the receiver 114 adapts to data rates that are mapped (e.g., assigned) based on the receiver CSI. This mapping may be performed at the receiver 114 based on the receiver CSI, and is transparent to the transmitter 110 (e.g., the transmitter 110 does not know what the actual mapping is). The receiver 114 may convey only the mapped state value to the transmitter 110 via the feedback channel 122. The table 400 shows each of the 8 possible rates represented by $N_b=\log_2 8=3$ bits. Assuming $N_t$=100 tones, the amount of feedback needed per update for all of the 100 tones would be 100*3=300 bits.

In one embodiment, a spectral binning algorithm may be used to judiciously combine (e.g., group or designate) several adjacent tones into a single spectral group (e.g., bin). According to this embodiment the feedback mechanism provides CSI updates on a per-bin basis instead of the per-tone basis as discussed earlier. This provides a feedback compression factor of $N_t/K_b$, where $N_t$ is the total number of tones and $K_b$ is the number of spectral bins. In one embodiment, the binning algorithm may combine a fixed number of tones in each bin, or the number of tones in different bins may be different. Furthermore, in another embodiment, the mapping from tones to bins may be determined beforehand and kept unchanged during the entire communication process. In yet another embodiment, the mapping may be dynamically changed during the course of communication. Higher variability in the binning algorithm may lead to finer granularity in the feedback process, and may incur a greater feedback load. The choice of the appropriate level of granularity may depend on the design constraints of the communication system 100. For more information regarding binning (e.g., spectral binning), reference is made to U.S. patent application Ser. No. 12/716,032, cited above. Spectral binning may be used in conjunction with the embodiments described herein.

Figure 5:
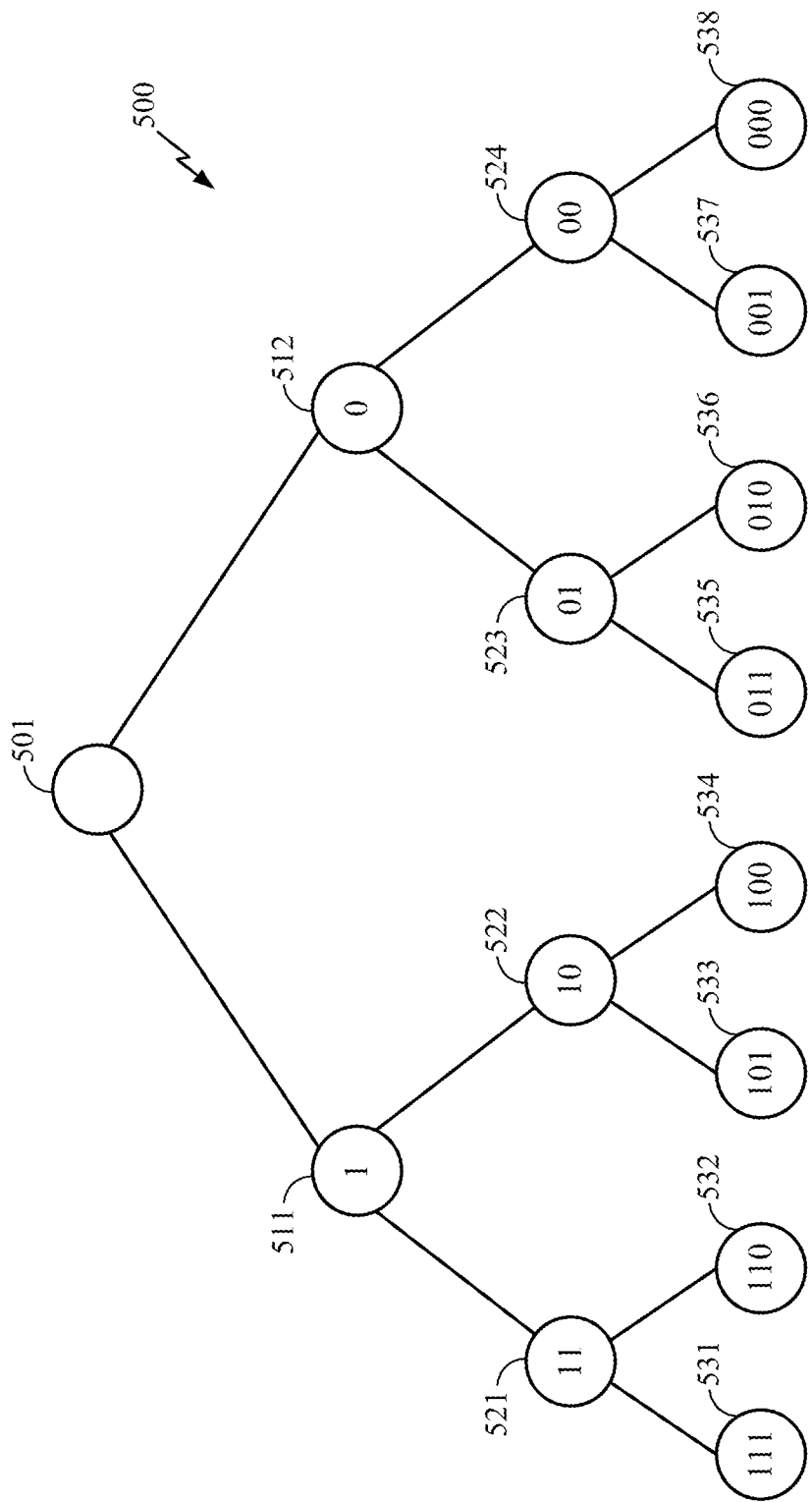
FIG. 5 shows a binary tree with a representation of the feedback states shown in FIG. 4.

FIG. 5 shows a binary tree with a representation of the feedback states shown in FIG. 4. A binary tree generally refers to a tree structure in which each node in the tree has at most two child nodes. The binary tree 500 has a root node 501. A first level of nodes, comprising nodes 511 and 512, are connected to the root node 501. A second level of nodes, comprising nodes 521, 522, 523, and 524, are connected to the first level nodes 511 and 512. The nodes 521 and 522 are connected to the node 511. The nodes 523 and 524 are connected to the node 512. A third level of nodes (e.g., the leaf nodes), comprising nodes 531, 532, 533, 534, 535, 536, 537, and 538 are connected to the second level nodes 521, 522, 523, and 524. The nodes 531 and 532 are connected to the node 521. The nodes 533 and 534 are connected to the node 522. The nodes 535 and 536 are connected to the node 523. The nodes 537 and 538 are connected to the node 524. The bit rates of the system 100 (shown in FIG. 4) which are represented by bit values "111" through "000", form the leaf nodes 531 through 538 of the binary tree 500, respectively. The depth of the binary tree 500 is $\lceil \log_2 n \rceil$, where n is the number of feedback states. For the binary tree 500, the depth of the binary tree 500 is $\log_2 8=3$.

The binary tree 500 illustrates how the "tiers" of feedback information may be constructed. As shown in FIG. 5, the binary tree 500 has 3 levels, (not including the root node 501). Each of the levels adds a "tier" of feedback information to the bit patterns in the nodes. For example, node 511 is a node in the first level of the binary tree 500. The bit pattern "1" is in node 511, which represents 1 tier of feedback information. Node 521 is a node in the second level of the binary tree 500. The bit pattern "11" is in node 521, which represents two tiers of feedback information. At each level of the binary tree 500, a new "tier" of feedback information is added to the bit pattern within the nodes in the level.

Figure 6:
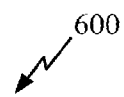
FIG. 6 is a table illustrating exemplary tier levels for Tones 1 through 10 of the communication system shown in FIG. 3.

FIG. 6 is a table 600 illustrating exemplary tier levels for Tones 1 through 10 of the communication system 100 shown in FIG. 3. The "Tone #" column identifies the tone number for a particular tone. The "Current State of Tone" column identifies the current state of the tone (e.g., the current state of Tone 1 is represented by the bit pattern 101). The "Tier 1" column identifies the value of the first bit (e.g., in this instance, the most significant bit or MSB) in the bit pattern for the tone, which is shown in the "Current State of Tone" column (e.g., the value of the first bit in the bit pattern for Tone 1 is "1"). The "Tier 2" column identifies the value of the second bit in the bit pattern for the tone, which is shown in the "Current State of Tone" column (e.g., the value of the second bit in the bit pattern for Tone 1 is "0"). The "Tier 3" column identifies the value of the third bit (e.g., in this instance, the least significant bit or LSB) in the bit pattern for the tone, which is shown in the "Current State of Tone" column (e.g., the value of the third bit in the bit pattern for Tone 1 is "1"). The bits in each tier level (e.g., Tier 1, Tier 2 and Tier 3) may be selectably used to communicate CSI from the receiver 114 to the transmitter 110 over the feedback channel 122.

Using the columns (e.g., Tiers 1 through 3), the CSI feedback may be sent over feedback channel 122 in terms of tier information, where each feedback bit, from most significant bit (MSB) to the least significant bit (LSB), comprises one tier level. For any node at level k in the binary tree 500 (where $1 \leq k \leq \lceil \log_2 n \rceil$ and n is the number of feedback states), the number of bits in the representation of the node is equal to k. This representation comprises the first k significant bits of all the leaf nodes (e.g., feedback states) that emerge from this node. At each feedback update, the CSI may be sent from the receiver 114 to the transmitter 110 in the form of tier information in this binary tree structure. For example, the Tier 1 information for Tones 1 through 10 would be the bit pattern "1111110000" (e.g., the first bit of each of the bit patterns representing the current state of Tones 1 through 10). The Tier 2 information for Tones 1 through 10 would be the bit pattern "0000101111" (e.g., the second bit of each of the bit patterns representing the current state of Tones 1 through 10). The Tier 3 information for Tones 1 through 10 would be the bit pattern "1101001001" (e.g., the third bit of each of the bit patterns representing the current state of Tones 1 through 10).

As discussed above, the Tier 1 information for Tones 1 through 10 is "1111110000", the Tier 2 information is "0000101111", and the Tier 3 information is "1101001001." In one embodiment, the bit patterns used to represent Tiers 1 through 3 may be compressed using a compression scheme e.g., Run Length Encoding (RLE). RLE generally refers to a form of data compression in which runs of data (e.g., sequences where the same data value occurs consecutively) are stored as a single data value and count, rather than as the original run. If RLE is used to compress the tier information for Tiers 1 through 3, the run lengths (e.g., the number of consecutive data values) for MSB tiers (e.g., tiers 1 and 2) sequences may be higher, as more consecutive tones may have same MSB of state.

Using RLE on the tiers 1 through 3 shown in table 600, compressed sequences cs(t), where "t" is the tier number, may be constructed as follows:
cs(1)—6 "1s", 4 "0s"
cs(2)—4 "0s", 1 "1", 1 "0", 4 "1s"
cs(3)—2 "1s", 1 "0", 1 "1", 2 "0s", 1 "1", 2 "0s", 1 "1"
The compressed sequences cs(t) indicate the number of consecutive data values in each of Tiers 1 through 3. For example, cs(1) indicates that there are 6"1s" followed by 4 "0s" in the Tier 1 information. cs(2) indicates that there are 4 "0s" followed by a single "1", a single "0", and 4 "1s" in the Tier 2 information.

In one embodiment, more compression may be achieved when sending feedback of higher MSB tiers (e.g. Tier 1). For example, more compression may be achieved when sending state information for Tier 1 using RLE because the tier information contains longer run lengths of consecutive data. In another embodiment, more compression may be achieved by omitting the last part of each sequence because of the constraint about the number of tones/bins. For example, for cs(1), only 6 is are sent by the receiver 114 on the feedback channel 122. The values which are not sent (e.g., the 4 "0s") may be inferred from the values which are sent (e.g., the 6 "1s"). For example, for cs(1), if the transmitter 110 knows there are only 10 tones total in channel 118, and it receives 6 "1s" from receiver 114, the transmitter 110 can infer that the other 4 bit values, which were not sent, should be "0s". One bit can be used to indicate the start pattern (e.g., 0 or 1) for each tier. In other embodiments, other types of coding and compression schemes, including, but not limited to, variable length coding (VLC) or arithmetic coding may also be used to compress the CSI instead of RLE. Sending compressed feedback for all the Tiers 1 through 3 using coding and compression schemes may provide lossless compression of the CSI sent from the receiver 114 to the transmitter 110 over the feedback channel 122. For example, in one embodiment using RLE, all of the tier information (e.g., Tier 1) is transmitted from the receiver 114 to the transmitter 110 using fewer bits due to the run lengths in the tier information, as described above. This allows the tier information to be compressed (e.g., sent using few bits), without losing accuracy and/or tier information. In another embodiment, the receiver 114 may determine whether to perform compression and/or coding schemes based on, at least in part, the bandwidth of the feedback channel 122. For example, if there is less bandwidth available on the feedback channel 122, the receiver 114 may compress the tier information. In another example, if there is more bandwidth available on the feedback channel 122, the receiver 114 may not compress the tier information. In a further embodiment, the receiver 114 may send feedback for some or all of the tiers depending on the bandwidth of the feedback channel. For example, if there is more bandwidth, the receiver 114 may send feedback for all the tiers. In another example, if there is less bandwidth, the receiver 114 may only send feedback for one or more of the tiers.

In another embodiment, the compression of the tier information using RLE may be performed using a run length threshold. For example, the information of a tier may comprise 10 bits: 0, 0, 0, 0, 0, 1, 0, 0, 0, and 0. There is only one value of "1" in the tier information. The receiver 114 may have a run length threshold which may be used to determine whether to encode the "1" value. For example, the run length threshold may be 3 (e.g., at least 3 consecutive bits which have the same value). This means that if there are not at least 3 of the same values in a row, then the values which do not meet the run length threshold may be set to a default value or may be set to the value of adjacent bits which do meet the run length threshold. In the above example, the single "1" value in the tier information may be converted to a "0" value, and then a RLE of 10"0"s may be used.

FIG. 7 is a table 700 illustrating other exemplary tier levels for Tones 1 through 10 of the communication system 100 shown in FIG. 3. The table 700 is similar to the table 600. However, in table 700, there are no values for the Tier 3 information.

In one embodiment, the amount of feedback information sent from the receiver 114 to the transmitter 110 on the feedback channel 122 may be reduced by exploiting spectral and/or temporal correlations. For example, since adjacent tones (e.g., Tones 1 through 10) may have similar frequency response (e.g., the adjacent tones may have spectral correlation), the respective channel states are likely to differ by fewer bit positions. States of adjacent tones and/or bins may likely differ in LSBs, while MSBs may likely be same over the coherence bandwidth (e.g., the frequency interval over which two frequencies are likely to experience comparable fading). As shown in FIG. 6, the states of Tones 1 through 10 differ from each other in the Tier 3 bits more than in Tier 1 bits. For example, Tones 1 through 6 have the same value (e.g., 1) in the Tier 1 bit. The Tones 1 through 4 and 6 also have the same values (e.g., 0) in the Tier 2 bit. This may be due to Tones 1 through 6 having similar frequency responses (e.g., having spectral correlation). In one embodiment, this spectral correlation may be exploited by using RLE to reduce the amount of feedback information sent by the receiver 114, as discussed above. Since the Tone 1 through 10 may be spectrally correlated, they will likely have similar Tier 1 and Tier 2 information, as shown in FIG. 6. Thus, the receiver 114 may not transmit Tier 1 and 2 information as frequently as it may transmit Tier 3 information.

In another embodiment, The Tone 1 through 10 may not change much over time. For example, over a certain period of time, only one or two tones may change their states. In a more specific example, Tone 1 may change states from "101" to "100". The two MSBs "10" did not change, only the LSB changed from "1" to "0". Furthermore, the channel 118 may be a slowly varying fading channel which signifies that states for a given tone may be unlikely to change significantly over a shorter period of time. It also signifies that temporally consecutive states may be more likely to differ in LSBs, while MSBs may remain the same over coherence time intervals. As a consequence, MSB changes/updates may be less frequent than LSB updates. Thus, MSB tier information may be transmitted less frequently then LSB tier information. In one embodiment, bits that are closer to the MSB position may be referred to as higher tier information and bits that are closer to the LSB position may be referred to as lower tier information.

In one embodiment omitting the LSB tier (e.g., Tier 3) may result in a reduction in the amount of CSI sent by the receiver 114 on the feedback channel 122. The lower tier feedback may be assumed (e.g., substituted) to be a default value (e.g., "0"). The omitted Tier 3 information may be substituted using a variety of different methods, techniques or algorithms. For example, the omitted tiers may always be valued at 0, or the omitted tiers may be valued at 1. In another example, the values of the omitted tiers may be based, at least in part, on the prior values of the omitted tiers. In another example, the substituted values for the omitted tiers may be computed based on the received tiers, or based on other metrics. This application does not limit the methods, techniques or algorithms which may be used to calculate the values for the omitted tiers. In one embodiment, the quantity of tier information which is omitted may increase when the number of tiers is larger. For example, FIG. 7 only shows three tiers, and only Tier 3 information is omitted. In another example, if the system 100 had 10 tiers (e.g., CSI for each tone is represented using 10 bits), then the receiver 114 may omit the last three tiers of information (e.g., Tier 8, Tier 9, Tier 10 information).

In one embodiment, the number of tiers which may be omitted may be based on, at least in part, the availability of bandwidth on the feedback channel 122. For example, if there is little bandwidth available on the feedback channel, then more tiers may be omitted (e.g., Tiers 2 and 3), and if there is high bandwidth available on the feedback channel, then no tiers or fewer tiers may be omitted (e.g., only Tier 3). In another embodiment, the number of tiers which may be omitted may be based on the error tolerance level of the communication system (e.g., the tolerance the communication system has for receiving incorrect or not receiving full CSI). A variety of factors may be considered when determining the number of tiers which may be omitted. This application does not limit the scope and range of these factors which may be considered.

In another embodiment, any tier or any combination of tiers may be omitted, instead of omitting LSB tiers. For example, if there are a total of five tiers, then only tier 4 information may be omitted. In a certain embodiment, the omitted tier information may not be contiguous (e.g., they do not need to be adjacent level tiers, such as Tiers 3 and 4). For example, if there are a total of five tiers, then Tier 2 information and Tier 4 information for may be omitted.

In one embodiment, the receiver 114 may only transmit tier information if the information for that particular tier has changed. For example, if the state of the Tone 3 (shown in Table 600 to be "100") changes to state 101, and no other tones change their state, then only the information for Tier 3 has changed, since only the last bit of state of the Tone 3 has changed from "0" to "1." In this scenario, the Tier 1 and the Tier 2 values for the Tone 3 did not change. Thus, the receiver 114 may only transmit Tier 3 information, and may not transmit Tier 1 and Tier 2 information. In another example, Tones 1 through 4 may have the same value (e.g., 0) in the Tier 2 bit position. Due to spectral correlation, value of the Tier 2 bit position for the Tones 1 through 4 may change to 1. The receiver 114 may only transmit Tier 2 information, and may not transmit Tier 1 and Tier 3 information, since only Tier 2 bits have changed.

Figure 8:
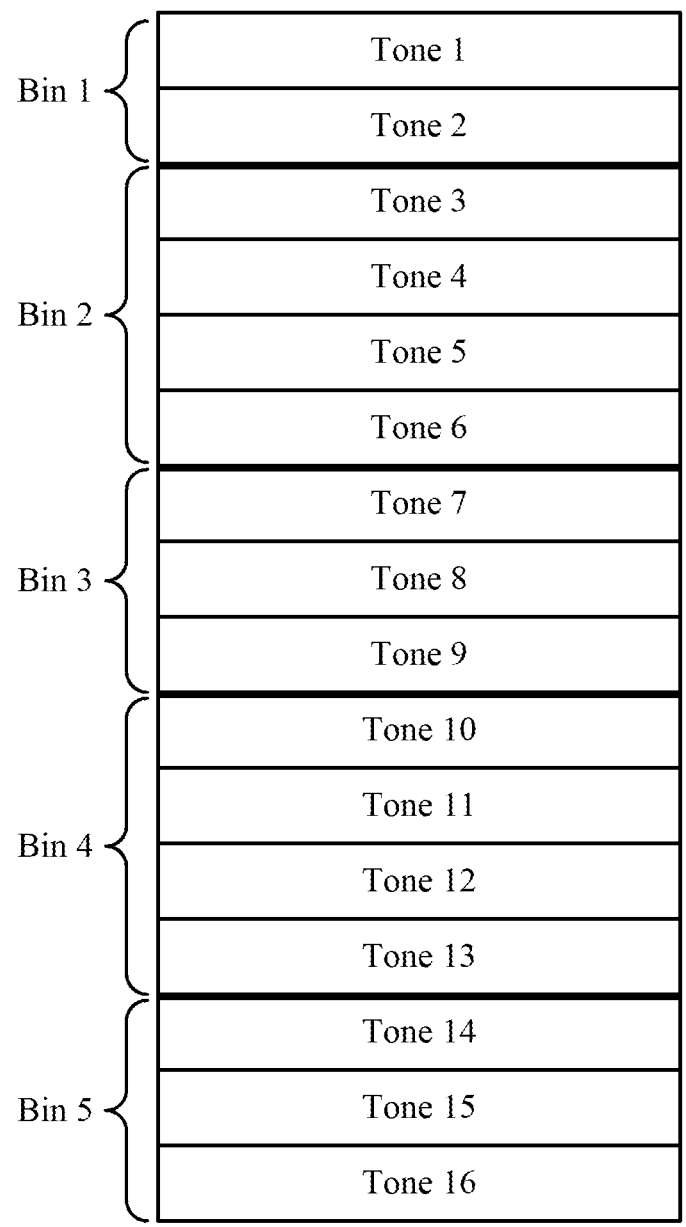
FIG. 8 is a diagram illustrating an exemplary binning of tones of the communication system of FIG. 3.

FIG. 8 is a diagram illustrating an exemplary binning of tones of the communication system of FIG. 3. In this embodiment, there are a total of 16 tones. Each of the Tones 1-16 is designated to one of spectral Bins 1-5. Tones 1 and 2 are designated to Bin 1, Tones 3 through 6 are designated to Bin 2, Tones 7 through 9 are designated to Bin 3, Tones 10 through 13 are designated to Bin 4, and Tones 14 through 16 are designated to Bin 5. Each of the Tones 1 through 16 may be designated to one of Bins 1-5 based on, at least in part, the channel characteristics of the tones. Each of Tones 1 through 16 may be designated to one of Bins 1-5 based on other factors. A variety of factors may be used to designate each of the Tones 1 through 16 to a Bins 1 through 5.

In one embodiment, a fixed-size binning algorithm may be used wherein an equal number of tones (e.g., 4 tones) are designated to each bin. In another embodiment shown in, there may be a variable-sized binning algorithm wherein a finer level of granularity may be achieved by allowing different bins to have a different number of tones. In yet another embodiment, a static binning algorithm may be used wherein the tones are not re-designated to different bins, even if their channel conditions change. The static binning algorithm may be used alone, or in combination with the fixed and the variable binning embodiments discussed above. In a certain embodiment, the receiver 114 may designate a fixed number of tones per bin, and once the designation is set, the tones are not re-designated to different bins, even if their channel conditions change. In another embodiment, the receiver 114 may designate a variable number of tones per bin, and once the designation is set, the tones are not re-designated to different bins, even if their channel conditions change. In one embodiment, a dynamic binning algorithm may be used, wherein different tones may be re-designated to different bins, depending on the channel conditions. The dynamic binning algorithm may be used alone, or in combination with the fixed and the variable binning embodiments discussed above.

In addition, a variety of methods may be used to provide CSI on a per bin basis. For example, the average noise level for all the tones in a bin may be used to provide CSI for the bin. In another example, the highest noise level or lowest noise level for all the tones may be used to provide CSI for the bin. In yet another example, the median noise level for all the tones may be used to provide CSI for the bin.

The above-embodiments may be applicable to spectral bins, such as Bins 1-5. Tier information may be obtained on a per bin basis rather then on a per tone basis. For example, referring to FIG. 6, instead of providing the current state of the Tones 1 through 10, the current states of Bins 1 through 10 may be provided. As shown in FIG. 8, Tones 3, 4, 5, and 6, are designated to Bin 2. Rather then transmitting tier information for each of Tones 3, 4, 5, and 6, the tones can be "binned" into Bin 2 and only tier information for the bin is sent, which may allow the receiver 114 to use few bits when transmitting tier information. The various embodiments described above may then be applied to the tier information for Tiers 1 through 3 of the Bins 1 through 10.

The above embodiments may provide several advantages. The tier information may exploit spectral and temporal correlation simultaneously. Furthermore, binning the different tones into bins may be equivalent to omitting lower tier information, as tones are aggregated based on higher tier CSI. The tier information may also be suitable for making efficient use of padding bytes in the data frames used by the communication system 100, which may result in no extra overhead for transmitting the tier information (e.g., by sending feedback for each tier in the padding bits of frames). In one embodiment, different tier levels may have different lengths and different update intervals. The amount of tier information sent by the receiver 114 may depend on the amount of information that may fit in padding area for the data frames. It may be possible to control the amount of CSI sent on the feedback channel 122 by adjusting the number of tiers depending on available padding area. In this embodiment it may be necessary to send the tier information using a bit map vector. This may require an additional $\lceil \log_2 (\lceil \log_2(n) \rceil) \rceil$ bits per tier.

The numerical examples provided in the above embodiments suggest that significant compression gains may be achieved by combining different embodiments. It may be necessary to determine the relevant system parameters, e.g., the binning parameters for the spectral binning algorithms, the state transition probabilities for the Markov model, and the specific state update mechanism for the binary tree structure. For further details on the Markov model and differential updates, reference is made to U.S. patent application Ser. No. 12/716,064, cited above. The state update mechanism for the binary tree structure may use new run lengths for different tiers, when channel conditions change for the tones in the system. This may be done either through extensive simulations or through analytical models. Rigorous performance evaluation of these algorithms may need to be carried out, including computation of the average feedback load and performance loss (rate mismatch, error probability degradation, etc.) due to CSI mismatch at the transmitter and the receiver.

Figure 9:
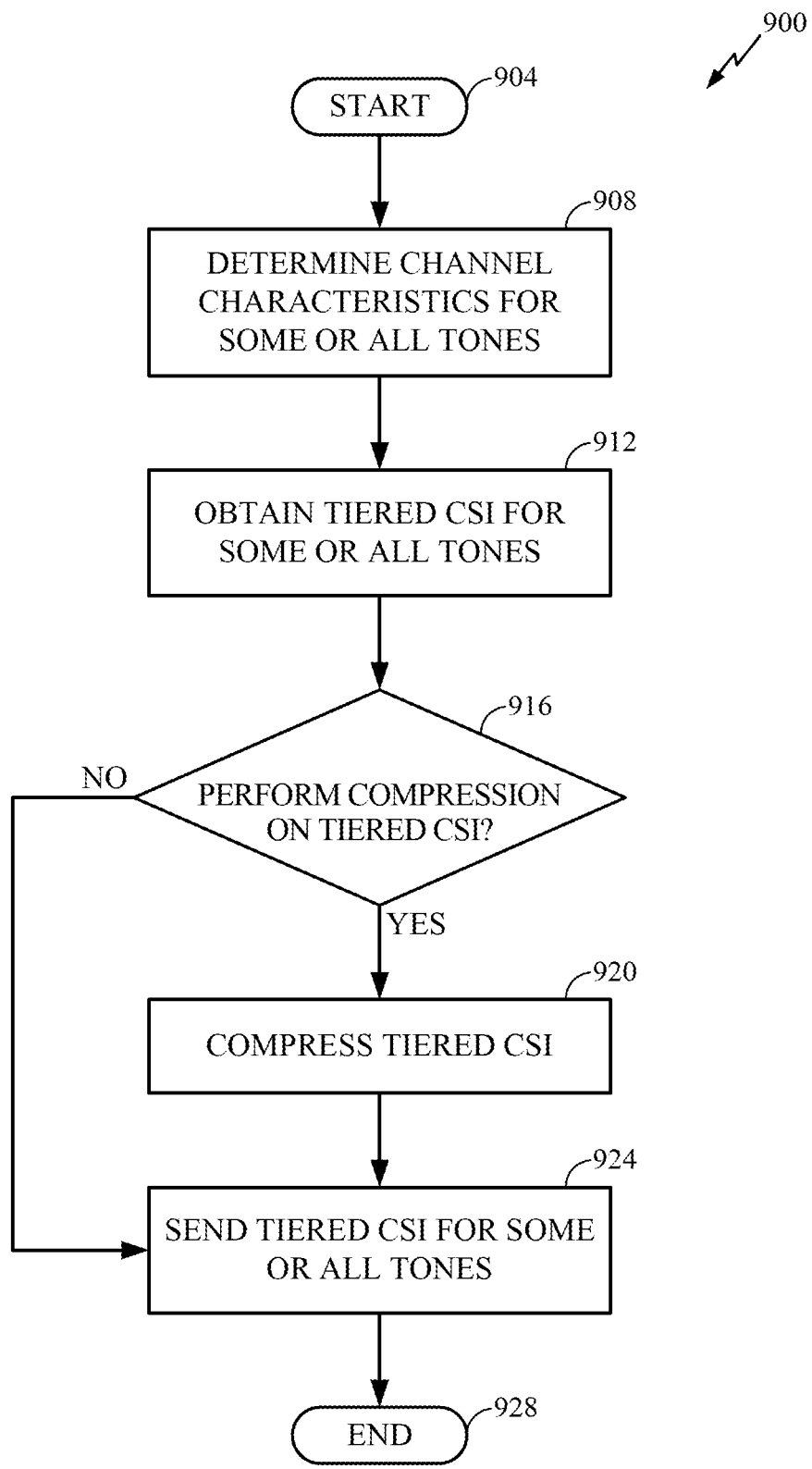
FIG. 9 is a flow chart illustrating a first exemplary process of communicating feedback information.

FIG. 9 is a flow chart illustrating a first exemplary process 900 of communicating feedback information. Process 900 illustrates how the receiver 114 may communicate CSI to the transmitter 110 via the feedback channel 122 as shown in the communication system 300 of FIG. 3. The process 900 may be performed by the receiver 114 using at least one of the memory 330, the processor 326, the channel estimator 338, the CSI module 342, and the network interface 334.

The process 900 starts at block 904 and moves to block 908. At block 908, the receiver 114 determines channel characteristics for some or all of the Tones 1 through N in the channel 118. The receiver may use network interface 334 to measure channel characteristics for some of all of the tones of the Tones 1 through N in the channel 118. The network interface 334 may then provide the measurements to the channel estimator module 338 which may further process the measurements. After determining the channel characteristics for Tones 1 through N, the process 900 the moves to block 912, where the receiver obtains tier information for some or all of the Tones 1 through N. The receiver may use the processor 326 and/or the CSI module 342 to obtain the state information (0 or 1) for each tier of each tone.

After obtaining the state information of different tiers for each tone, the process 900 then moves to block 916. At block 916, the receiver 114 determines whether to compress the tier information obtained in block 912. For example, the receiver 114 may determine whether or not to apply some form of compression on the tier information (e.g., RLE) as discussed above. The determination of whether to compress the tier information may be based on a variety of factors, including, but not limited to, the bandwidth of the feedback channel 122 and the quantity of tier information. In one embodiment, the receiver 114 may receive pre-determined criteria (e.g., available bandwidth on the feedback channel, accuracy threshold of CSI, error tolerance of the system for channel feedback, etc.) for determining whether to perform compression on the tier information. For example, receiver 114 may have a hardware and/or a software module installed with pre-determined criteria for determining whether to compress the tier information. If the receiver 114 determines that the tier information should not be compressed, the process 900 moves to block 924. If the receiver determines that the tier receiver 114 determines that the tier information should be compressed, the process 900 moves to block 920, where the tier information is compressed using a compression or coding scheme as discussed above in FIG. 6.

At block 924, the receiver 114 sends the tier information for some or all of Tones 1 through N to the transmitter 110 over feedback channel 122. The receiver 114 may use the network interface 334 to send the tier information. If the tier information was compressed at block 920, then the receiver 114 sends the compressed tier information. If the tier information was not compressed, then the receiver 114 sends the complete tier information.

Figure 10:
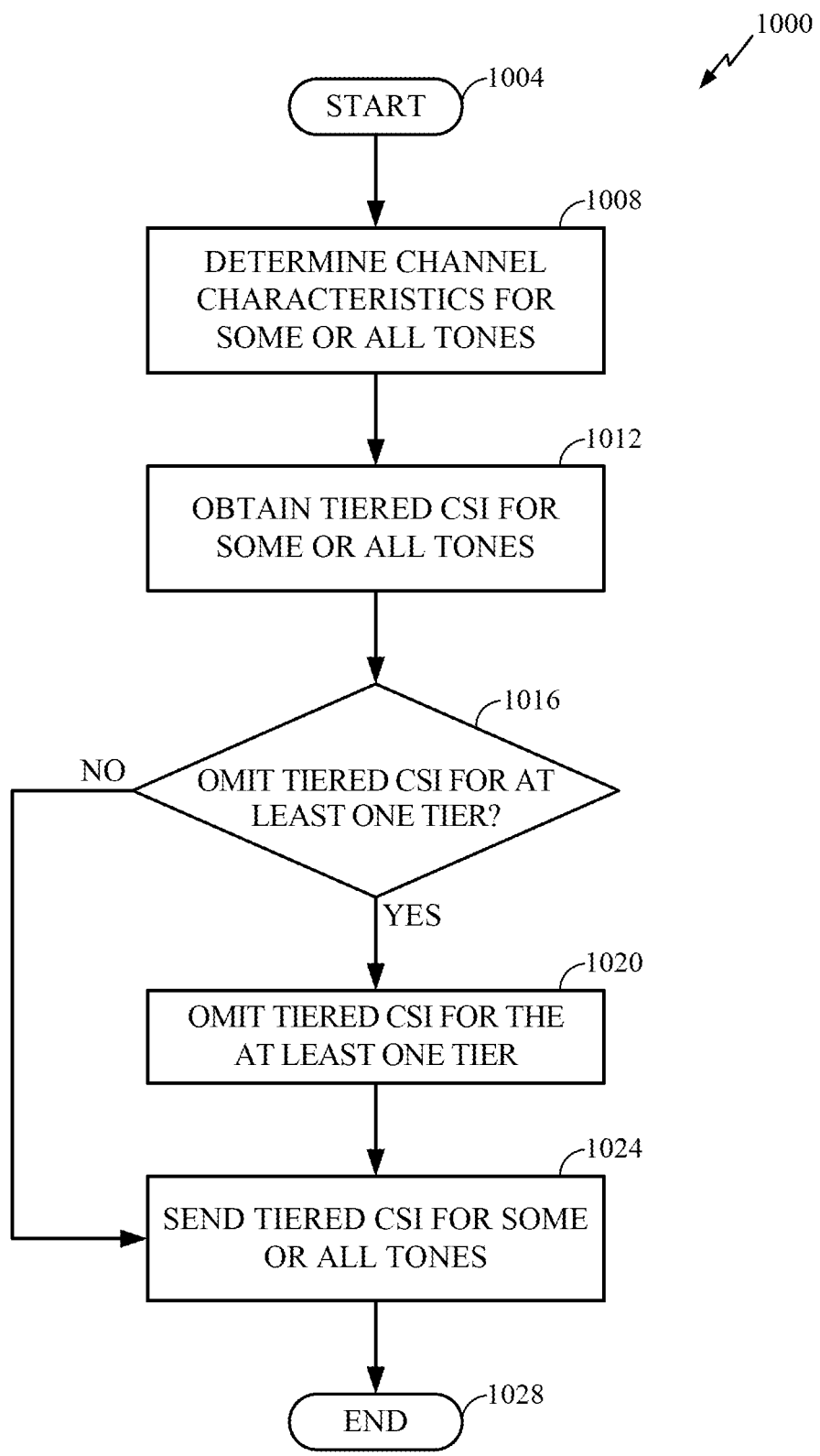
FIG. 10 is a flow chart illustrating a second exemplary process of communicating feedback information.

FIG. 10 is a flow chart illustrating a second exemplary process of communicating feedback information. Process 1000 illustrates how the receiver 114 may communicate CSI to the transmitter 110 via the feedback channel 122 as shown in the communication system 300 of FIG. 3. The process 1000 may be performed by receiver 114 using at least one of the memory 330, the processor 326, the channel estimator 338, the CSI module 342, and the network interface 334.

The process 1000 starts at block 1004 and moves to block 1008. At block 1008, the receiver 114 determines channel characteristics for some or all of the Tones 1 through N in the channel 118. The receiver may use network interface 334 to measure channel characteristics for some of all of the tones of the Tones 1 through N in the channel 118. The network interface 334 may then provide the measurements to the channel estimator module 338 which may further process the measurements. After determining the channel characteristics for Tones 1 through N, the process 1000 the moves to block 1012, where the receiver obtains tiered CSI for some or all of the Tones 1 through N. The receiver may use the processor 326 and/or the CSI module 342 to obtain the tiered CSI.

After obtaining the tiered CSI, the process 1000 then moves to block 1016. At block 1016, the receiver 114 determines whether to omit any of the tiered CSI obtained in block 1012. The determination of whether to omit any of the tiered CSI may be based on a variety of factors, including, but not limited to, the bandwidth of the feedback channel 122 and the quantity of tiered CSI. In one embodiment, the receiver 114 may receive pre-determined criteria for determining whether to omit any of the tiered CSI. For example, receiver 114 may have a hardware and/or a software module installed with pre-determined criteria for determining whether to omit any of the tiered CSI. If the receiver 114 determines that no tiered CSI should be omitted, the process 1000 moves to block 1024. If the receiver determines that the tier receiver 114 determines that some tiered CSI should be omitted, the process 1000 moves to block 1020, where the tiered CSI is omitted as discussed above in FIG. 7. The receiver 114 may use the processor 326 and/or the CSI module 342 when omitting tiered CSI.

At block 1024, the receiver 114 sends the tiered CSI for some or all of Tones 1 through N to the transmitter 110 over feedback channel 122. The receiver 114 may use the network interface 334 to send the tiered CSI. If any of the tiered CSI was omitted at block 1020, then the receiver 114 sends all the tiered CSI except for the omitted tiered CSI. If none of the tiered CSI was omitted, then the receiver 114 sends the complete tiered CSI.

The following embodiments are generally directed to systems and methods for conveying CSI from the receiver 114 to the transmitter 110 over the feedback channel 122 in the communication system 100 shown in FIG. 3. The following embodiments may also reference elements shown in FIG. 3.

As discussed above, one of the many objectives of the CSI may be to enable adaptive resource allocation of the channel 118 at the transmitter 110. Even if the communication system 100 uses the binning processes described above, the size of each CSI packet may be larger than the available fields in existing packet header (e.g., supplemental information such as addresses, type of date etc.) formats. In the communication system 100, it may be difficult to update the hardware and/or software of the transmitter 110 and the receiver 114. New types of CSI such as differential CSI (e.g., CSI which provides information about how channel characteristics have changed from the previous set of CSI) and binning CSI (e.g., CSI provided on a per bin basis) and tiered CSI (e.g., CSI provided on a tier basis as described in FIGS. 5-7, 9, and 10) may be used by the receiver 114 and the transmitter 110. Thus, it is desirable to convey new types and/or more CSI without substantially changing the transmitter 110 and the receiver 114 of the communication system 100.

In one embodiment, the tiered CSI feedback mechanism, may also exploit the temporal correlation of tones. A slowly varying fading channel may signify that states for a given tone are unlikely to have big jumps in the tree diagram (e.g., temporally consecutive states are more likely to differ in LSBs while MSBs will be same over coherence time intervals). MSB updates may be less frequent than LSB updates. For example if at a later time, only the 2nd or 3rd tier channel state has change compared to channel the state from a previous time, then only feedback for the 2nd or 3rd tier is sent. The Markov model discussed above can also be used in conjunction for sending differential updates of successive sequences for the same tier. For example, from the tier information for Tier 1 may not change during a period of time, and a differential update indicating that no changed has occurred may be sent from the receiver 114 to the transmitter 110. In another example, if only tier 1 information for Tier 1 has changed, a differential update containing the data indicative of the differences from the previous Tier 1 information with the current Tier 1 information may be sent from the receiver 114 to the transmitter 110.

In one embodiment the CSI may comprise a new Application Specific Information Element (ASIE). The ASIE may allow new types of information to be sent in communication system 100, without substantially modifying the existing hardware/software of communication system 100. The ASIE may comprise a Specifier ID 16-bit field which identifies a company or organization who defines the format and use of the ASIE. The ASIE may be sent in beacon and/or control frames (e.g., frames which may be used to coordinate the receiver 114 and transmitter 110 and may be used to provide timing, scheduling, capability, and other information). This embodiment may not require changes in the communication system 100. If a new ASIE is transmitted from the receiver 114 to the transmitter 110, and the transmitter 110 does not support the new ASIE, the transmitter 110 may simply ignore the ASIE. This embodiment may be used when CSI is sent on a best effort basis, e.g., the feedback is sent only when the beacon slot can accommodate the CSI. In another embodiment, the CSI may comprise at least one of an Application-Specific Control Frame and an Application Specific Command Frame. The Application-Specific Control and Command Frame may also comprise Specifier ID field. The company or organization associated with the Specifier ID may define the format and use of the Data field in the Application-Specific Control or Command frames.

Another embodiment may use a block-acknowledgement (B-ACK) to send CSI. The communication system 100 (e.g., such as an OFDM system) may enable the receiver 114 to acknowledge the receipt of a sequence of MAC service data units (MSDUs) using a B-ACK packet. The B-ACKs may be sent by the receiver 114 when there is a B-ACK request from the transmitter 110 for the MSDUs sent from the transmitter 110 to the receiver 114 over the channel 118. The CSI may be sent along with the B-ACK information in an "enhanced" B-ACK packet. In this embodiment, the periodicity of CSI feedback may depend on the periodicity of the B-ACK packets. In another embodiment, the CSI packets may need to be fragmented. Certain embodiments may require changes the communication system 100 as a new type of "enhanced" B-ACK may need to be defined.

In another embodiment the ASIE containing CSI may also be sent from the receiver 114 to the transmitter 110 using MAC command frames during reserved medium access slots (MASs). The reserved MASs are used by the receiver 114 to transmit the CSI to the transmitter 110 over the feedback channel 122. This embodiment may allow CSI to be sent to the transmitter 114 at consistent time intervals. The timing and frequency of CSI may be set up during the MAS reservation negotiations between the transmitter 110 and the receiver 114. In another embodiment, prioritized contention access (PCA) may be may be used to transmit CSI over the feedback channel 122 when both transmitter 110 and receiver 114 support PCA.

As shown in FIG. 3, the channel 118 may be used to transmit data between transmitter 110 and receiver 114. Data may be transmitted bi-directionally, meaning that data may be transmitted from the transmitter 110 to the receiver 114, and it may be transmitted from the receiver 114 to the transmitter 110. In one embodiment, CSI may be "piggybacked" e.g., sent along with, the data traffic sent from the receiver 114 to the transmitter 110. In this embodiment, the CSI packets may be fragmented. This embodiment may be suitable if there is steady data traffic sent from the receiver 114 to the transmitter 110.

As shown in FIG. 3, the channel 118 may be used to transmit data between transmitter 110 and receiver 114. Data may be transmitted bi-directionally, meaning that data may be transmitted from the transmitter 110 to the receiver 114, and it may be transmitted from the receiver 114 to the transmitter 110. In one embodiment, CSI may be "piggybacked" e.g., sent along with, the data traffic sent from the receiver 114 to the transmitter 110. In this embodiment, the CSI packets may be fragmented. This embodiment may be suitable if there is steady data traffic sent from the receiver 114 to the transmitter 110.

The above-embodiments may be combined to and/or used in conjunction with each other. For example, beacons may be used for a full state update (e.g., providing CSI for all tones, without using binning) and one of enhanced B-ACK or piggybacking may be used for binning CSI on a best effort basis. In one embodiment, when there is temporal correlation between tones, differential updates may be used in conjunction with the tier information. For example, if nothing has changed for a particular tier, then a differentially update indicating "no change" may be sent from the receiver 114 to the transmitter 110. Some embodiments may need enhancements to the existing MAC functionalities to accommodate enhanced B-ACK and piggybacking.

Figure 11:
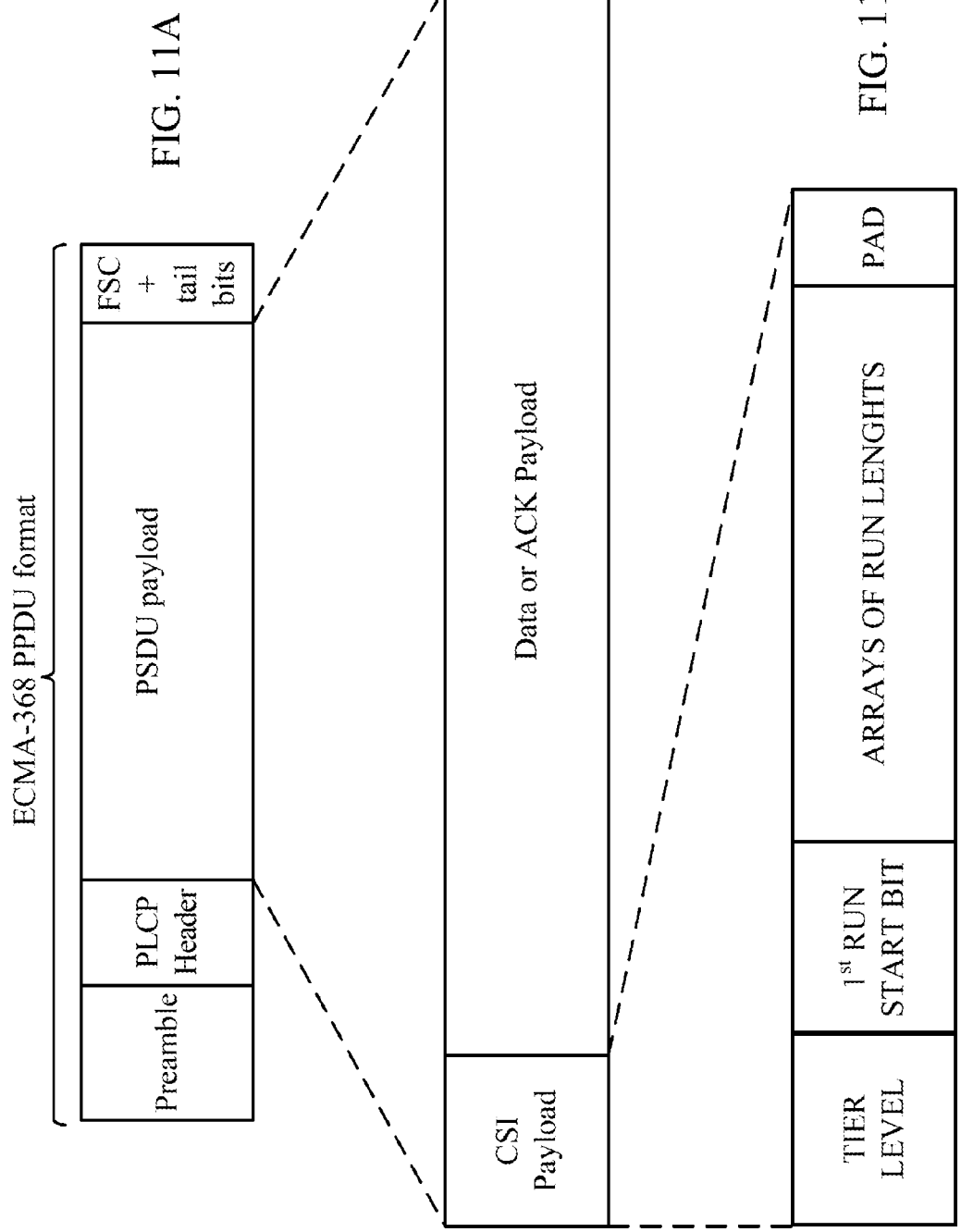
FIGS. 11A-11C show an exemplary format of a Physical Layer Convergence Procedure (PLCP) Protocol Data Unit (PPDU), according to one embodiment.

FIGS. 11A-11C show an exemplary format of a Physical Layer Convergence Procedure (PLCP) Protocol Data Unit (PPDU) 1100, according to one embodiment. In the embodiment shown in FIG. 11A, the PPDU may be used by the ECMA-368 standard. The PPDU 1100 may comprises a preamble, a PLCP header, a physical layer service data unit (PSDU) payload, a frame check sequence (FCS) and tail bits. As shown in FIG. 11B, the PSDU payload may comprises a CSI payload and a data and/or acknowledgement (ACK) payload. As shown in FIG. 11C, the CSI payload may comprise information indicative of a tier level, a first run start bit, arrays of run lengths, and pad bits.

Referring to FIG. 6, the Tier 1 information for Tones 1 though 10 is the bit pattern "1111110000." As discussed above, the Tier 1 information may be represented as a compressed sequence cs(1) which has 6"1s", 4 "0s." In one embodiment, when transmitting the Tier 1 information shown in FIG. 6, the receiver 114 may set the value of the tier level (shown in FIG. 11C) to "1", the value of the first run start bit (shown in FIG. 11C) to "1", and the array of run lengths (shown in FIG. 11C) to be [6, 4]. The array of run lengths would indicate that there are 6 "1s" and 4 "0s." Also referring to FIG. 6, the Tier 2 information for Tones 1 through 10 is the bit pattern "0000101111." As discussed above, the Tier 2 information may be represented as a compressed sequence cs(2) which has 4 "0s", 1 "1", 1 "0", and 4 "1s." In another embodiment, when transmitting the Tier 2 information as shown in FIG. 6, the receiver 114 may set the value of the tier level (shown in FIG. 11C) to "2", the value of the first run start bit (shown in FIG. 11C) to "0", and the array of run lengths (shown in FIG. 11C) to be [4, 1, 1, 4]. The array of run lengths would indicate that there are 4 "0s," 1"1," 1"0," and 4 "1s."

FIG. 12 is a table 1200 showing exemplary feedback loads for and exemplary average data rates. The table 1200 has three main columns labeled: "Compression Scheme," "Feedback load (bits)," and "Average Rate (Mbps)." The table 1200 also has two main rows labeled: "No compression" and "Hierarchical Tree Method." The Hierarchical Tree Method row is further divided into two sub-rows labeled "Tier 1, 2, 3" and "Tier 1, 2." The table 1200 merely shows exemplary feedback loads for and exemplary average data rates according to one embodiment. Different embodiments may have different feedback loads and different average data rates.

As shown in table 1200, when no compression scheme is used, the feedback load for providing CSI from the receiver 114 to the transmitter 110 is 384 bits, and the average rate (of data) achieved between the receiver 114 and the transmitter is 226.14 megabits per second (Mbps). When the receiver 114 transmits Tier 1, 2, and 3 information to the transmitter 110, the feedback load for providing tiered CSI is 490.14 bits and the average rate (of data) achieved is 226.14 Mbps. When the receiver 114 transmits only Tier 1 and 2 information to the transmitter 110, the feedback load for providing the tiered CSI is only 270.49 bits and the average rate (of data) achieved is 211.4 Mbps.

The CSI packet 1100 may be highly time-sensitive. Thus, in one embodiment, these packets are not be fragmented many times as this may delay the transmission of the CSI packet 1100 from the receiver 114 to the transmitter 110. New CSI packets, such as CSI packet 1100, may be generated based on recent channel estimates. If the new CSI packets vary from the previous ones, then the transmission of the fragments of previous CSI packet may be stopped and the new CSI packets may be transmitted instead. In another embodiment, the receiver 114 may transmit a fragmented full CSI packet or transmit a complete differential CSI packet. As discussed earlier, a full CSI packet may be sent after regular intervals. In one embodiment, a full CSI packet may be sent if the receiver 114 determines that the differential CSI packet will not provide accurate enough CSI to the transmitter 110. The receiver 114 may have a threshold level for the accuracy of the CSI.

The above-described methods may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above. In addition, the steps described in the above-referenced figures may be performed in a different order, may be performed simultaneously and certain of the steps may be omitted.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A wireless communication apparatus operable in a communication system, the wireless communication apparatus comprising:
a channel estimator module configured to indicate a state of a first channel condition for a first carrier frequency group using a first plurality of bits, and configured to indicate a state of a second channel condition for a second carrier frequency group using a second plurality of bits, each of the first and second plurality of bits being equally arranged in a plurality of same bit positions between a most significant bit position and a least significant bit position;
a processor module configured to identify a bit position in at least one of the plurality of bit positions in which a bit value has changed to identify a changed bit position; and
a communication module configured to communicate from a receiver to a transmitter data indicative of bit values of all bits located in the changed bit position within each of the first and second plurality of bits.

2. The apparatus of claim 1, wherein the first channel condition and the second channel condition comprises at least one of a data rate, a throughput, a noise level, an SNR level, a power level, and a channel quality indicator.

3. The apparatus of claim 1, wherein the communication module is further configured to refrain from communicating from the receiver to the transmitter data indicative of a bit value for a bit located in a bit position, within the first and second plurality of bits, that is different from the changed bit position.

4. The apparatus of claim 1, wherein the processing module is further configured to reduce the amount of data indicative of bit values of all bits located in the changed bit position within the first and second plurality of bits by using at least one of a coding scheme using a variable number of bits to encode data and a coding scheme where a first data is encoded using a first number bits, and a second data, which is less frequently used than the first data, is encoding using a second number of bits, which is larger than the first number of bits.

5. The apparatus of claim 1, wherein the first carrier frequency group comprises at least a first carrier frequency and the second carrier frequency group comprises at least a second carrier frequency.

6. The apparatus of claim 1, wherein a quantity of bits for the data indicative of bit values located in the changed bit position is less than the sum of the first and second plurality of bits.

7. A wireless communication apparatus operable in a communication system, the wireless communication apparatus comprising:
 means for indicating a state of a first channel condition for a first carrier frequency group using a first plurality of bits, and indicating a state of a second channel condition for a second carrier frequency group using a second plurality of bits, each of the first and second plurality of bits being equally arranged in a plurality of same bit positions between a most significant bit position and a least significant bit position;
 means for identifying a bit position in at least one of the plurality of bit positions in which a bit value has changed to identify a changed bit position; and
 means for communicating from a receiver to a transmitter data indicative of bit values of all bits located in the changed bit position within each of the first and second plurality of bits.

8. The apparatus of claim 7, wherein the first channel condition and the second channel condition comprises at least one of a data rate, a throughput, a noise level, an SNR level, a power level, and a channel quality indicator.

9. The apparatus of claim 7, wherein the means for communicating is further configured to refrain from communicating from the receiver to the transmitter data indicative of a bit value for a bit located in a bit position, within the first and second plurality of bits, that is different from the changed bit position.

10. The apparatus of claim 7, wherein the means for identifying is further configured to reduce the amount of data indicative of bit values of all bits located in the changed bit position within the first and second plurality of bits by using at least one of a coding scheme using a variable number of bits to encode data and a coding scheme where a first data is encoded using a first number bits, and a second data, which is less frequently used than the first data, is encoding using a second number of bits, which is larger than the first number of bits.

11. The apparatus of claim 7, wherein the first carrier frequency group comprises at least a first carrier frequency and the second carrier frequency group comprises at least a second carrier frequency.

12. The apparatus of claim 7, wherein a quantity of bits for the data indicative of bit values located in the changed bit position is less than the sum of the first and second plurality of bits.

13. A method of communicating in a communication system, the method comprising:
 indicating a state of a first channel condition for a first carrier frequency group using a first plurality of bits, and indicating a state of a second channel condition for a second carrier frequency group using a second plurality of bits, each of the first and second plurality of bits being equally arranged in a plurality of same bit positions between a most significant bit position and a least significant bit position;
 identifying a bit position in at least one of the plurality of bit positions in which a bit value has changed to identify a changed bit position; and
 communicating from a receiver to a transmitter data indicative of bit values of all bits located in the changed bit position within each of the first and second plurality of bits.

14. The method of claim 13, wherein the first channel condition and the second channel condition comprises at least one of a data rate, a throughput, a noise level, an SNR level, a power level, and a channel quality indicator.

15. The method of claim 13, further comprising refraining from communicating from the receiver to the transmitter data indicative of a bit value for a bit located in a bit position, within the first and second plurality of bits, that is different from the changed bit position.

16. The method of claim 13, further comprising reducing the amount of data indicative of bit values of all bits located in the changed bit position within the first and second plurality of bits by using at least one of a coding scheme using a variable number of bits to encode data and a coding scheme where a first data is encoded using a first number bits, and a second data, which is less frequently used than the first data, is encoding using a second number of bits, which is larger than the first number of bits.

17. The method of claim 13, wherein the first carrier frequency group comprises at least a first carrier frequency and the second carrier frequency group comprises at least a second carrier frequency.

18. The method of claim 13, wherein a quantity of bits for the data indicative of bit values located in the changed bit position is less than the sum of the first and second plurality of bits.

19. A computer program product, comprising:
 non-transitory computer-readable medium comprising:
 code for causing a computer to indicate a state of a first channel condition for a first carrier frequency group using a first plurality of bits, and to indicate a state of a second channel condition for a second carrier frequency group using a second plurality of bits, each of the first and second plurality of bits being equally arranged in a plurality of same bit positions between a most significant bit position and a least significant bit position;
 code for causing a computer to identify a bit position in at least one of the plurality of bit positions in which a bit value has changed to identify a changed bit position; and
 code for causing a computer to communicate from a receiver to a transmitter data indicative of bit values of all bits located in the changed bit position within each of the first and second plurality of bits.

20. The computer program product of claim 19, wherein the first channel condition and the second channel condition comprises at least one of a data rate, a throughput, a noise level, an SNR level, a power level, and a channel quality indicator.

21. The computer program product of claim 19, wherein the medium further comprises code for causing a computer to refrain from communicating from the receiver to the transmitter data indicative of a bit value for a bit located in a bit position, within the first and second plurality of bits, that is different from the changed bit position.

22. The computer program product of claim 19, wherein the medium further comprises code for causing a computer reduce the amount of data indicative of bit values of all bits located in the changed bit position within the first and second plurality of bits by using at least one of a coding scheme using a variable number of bits to encode data and a coding scheme where a first data is encoded using a first number bits, and a second data, which is less frequently used than the first data, is encoding using a second number of bits, which is larger than the first number of bits.

23. The computer program product of claim 19, wherein the first carrier frequency group comprises at least a first carrier frequency and the second carrier frequency group comprises at least a second carrier frequency.

24. The computer program product of claim 19, wherein a quantity of bits for the data indicative of bit values located in the changed bit position is less than the sum of the first and second plurality of bits.

25. A wireless communication apparatus operable in a communication system, the wireless communication apparatus comprising:
a channel estimator module configured to indicate a state of a first channel condition for a first carrier frequency group using a first plurality of bits, and configured to indicate a state of a second channel condition for a second carrier frequency group using a second plurality of bits, each of the first and second plurality of bits being arranged in N bit positions between a most significant bit position and a least significant bit position, wherein "N" is an integer greater than one (1); and
a communication module configured to communicate from a receiver to a transmitter data indicative of bit values located in K bit positions within the first and second plurality of bits, wherein "K" is an integer less than "N."

26. The apparatus of claim 25, wherein the first channel condition and the second channel condition comprises at least one of a data rate, a throughput, a noise level, an SNR level, a power level, and a channel quality indicator.

27. The apparatus of claim 25, wherein the channel estimator module is further configured to reduce the amount of data indicative of bit values located in K bit positions within the first and second plurality of bits by using at least one of a coding scheme using runs of data, a coding scheme where source symbols are mapped to a variable number of bits, and a coding scheme where a first data is encoded using a first number bits, and a second data, which is less frequently used than the first data, is encoding using a second number of bits, which is larger than the first number of bits.

28. The apparatus of claim 25, wherein the first carrier frequency group comprises at least a first carrier frequency and the second carrier frequency group comprises at least a second carrier frequency.

29. The apparatus of claim 25, wherein a quantity of bits for the data indicative of bit values located in the changed bit positions is less than the sum of the first and second plurality of bits.

30. The apparatus of claim 25, wherein the difference between K and N is based on, at least in part, a bandwidth of a feedback channel between the transmitter and the receiver.

31. The apparatus of claim 30, wherein the difference between K and N is decreased if the bandwidth of the feedback channel increases, and the difference between K and N is increased if the bandwidth of the feedback channel decreases.

32. A wireless communication apparatus operable in a communication system, the wireless communication apparatus comprising:
means for indicating a state of a first channel condition for a first carrier frequency group by using a first plurality of bits, and indicating a state of a second channel condition for a second carrier frequency group by using a second plurality of bits, each of the first and second plurality of bits being arranged in N bit positions between a most significant bit position and a least significant bit position, wherein "N" is an integer greater than one (1); and
means for communicating from a receiver to a transmitter data indicative of bit values located in K bit positions within the first and second plurality of bits, wherein "K" is an integer less than "N."

33. The apparatus of claim 32, wherein the first channel condition and the second channel condition comprises at least one of a data rate, a throughput, a noise level, an SNR level, a power level, and a channel quality indicator.

34. The apparatus of claim 32, wherein the means for indicating is further configured to reduce the amount of data indicative of bit values located in K bit positions within the first and second plurality of bits by using at least one of a coding scheme using runs of data, a coding scheme where source symbols are mapped to a variable number of bits, and a coding scheme where a first data is encoded using a first number bits, and a second data, which is less frequently used than the first data, is encoding using a second number of bits, which is larger than the first number of bits.

35. The apparatus of claim 32, wherein the first carrier frequency group comprises at least a first carrier frequency and the second carrier frequency group comprises at least a second carrier frequency.

36. The apparatus of claim 32, wherein a quantity of bits for the data indicative of bit values located in the changed bit positions is less than the sum of the first and second plurality of bits.

37. The apparatus of claim 32, wherein the difference between K and N is based on, at least in part, a bandwidth of a feedback channel between the transmitter and the receiver.

38. The apparatus of claim 37, wherein the difference between K and N is decreased if the bandwidth of the feedback channel increases, and the difference between K and N is increased if the bandwidth of the feedback channel decreases.

39. A method of communicating in a communication system, the method comprising:
indicating a state of a first channel condition for a first carrier frequency group by using a first plurality of bits, and indicating a state of a second channel condition for a second carrier frequency group by using a second plurality of bits, each of the first and second plurality of bits being arranged in N bit positions between a most significant bit position and a least significant bit position, wherein "N" is an integer greater than one (1); and
communicating from a receiver to a transmitter data indicative of bit values located in K bit positions within the first and second plurality of bits, wherein "K" is an integer less than "N."

40. The method of claim 39, wherein the first channel condition and the second channel condition comprises at least one of a data rate, a throughput, a noise level, an SNR level, a power level, and a channel quality indicator.

41. The method of claim 39, wherein the means for indicating is further configured to reduce the amount of data indicative of bit values located in K bit positions within the first and second plurality of bits by using at least one of a coding scheme using runs of data, a coding scheme where source symbols are mapped to a variable number of bits, and a coding scheme where a first data is encoded using a first number bits, and a second data, which is less frequently used than the first data, is encoding using a second number of bits, which is larger than the first number of bits.

42. The method of claim 39, wherein the first carrier frequency group comprises at least a first carrier frequency and the second carrier frequency group comprises at least a second carrier frequency.

43. The method of claim 39, wherein a quantity of bits for the data indicative of bit values located in the changed bit positions is less than the sum of the first and second plurality of bits.

44. The method of claim 39, wherein the difference between K and N is based on, at least in part, a bandwidth of a feedback channel between the transmitter and the receiver.

45. The method of claim 44, wherein the difference between K and N is decreased if the bandwidth of the feedback channel increases, and the difference between K and N is increased if the bandwidth of the feedback channel decreases.

46. A computer program product, comprising:
non-transitory computer-readable medium comprising:
code for causing a computer to indicate a state of a first channel condition for a first carrier frequency group using a first plurality of bits, and to indicate a state of a second channel condition for a second carrier frequency group using a second plurality of bits, each of the first and second plurality of bits being arranged in N bit positions between a most significant bit position and a least significant bit position, wherein "N" is an integer greater than one (1); and
code for causing a computer to communicate from a receiver to a transmitter data indicative of bit values located in K bit positions within the first and second plurality of bits, wherein "K" is an integer less than "N."

47. The computer program product of claim 46, wherein the first channel condition and the second channel condition comprises at least one of a data rate, a throughput, a noise level, an SNR level, a power level, and a channel quality indicator.

48. The computer program product of claim 46, wherein the computer-readable medium further comprises code for causing a computer to reduce the amount of data indicative of bit values located in K bit positions within the first and second plurality of bits by using at least one of a coding scheme using runs of data, a coding scheme where source symbols are mapped to a variable number of bits, and a coding scheme where a first data is encoded using a first number bits, and a second data, which is less frequently used than the first data, is encoding using a second number of bits, which is larger than the first number of bits.

49. The computer program product of claim 46, wherein the first carrier frequency group comprises at least a first carrier frequency and the second carrier frequency group comprises at least a second carrier frequency.

50. The computer program product of claim 46, wherein a quantity of bits for the data indicative of bit values located in the changed bit positions is less than the sum of the first and second plurality of bits.

51. The computer program product of claim 46, wherein the difference between K and N is based on, at least in part, a bandwidth of a feedback channel between the transmitter and the receiver.

52. The computer program product of claim 51, wherein the difference between K and N is decreased if the bandwidth of the feedback channel increases, and the difference between K and N is increased if the bandwidth of the feedback channel decreases.

* * * * *